(12) United States Patent
Lum et al.

(10) Patent No.: US 8,270,003 B2
(45) Date of Patent: *Sep. 18, 2012

(54) METHODS AND SYSTEMS FOR INTEGRATING IMAGING DEVICE DISPLAY CONTENT

(75) Inventors: Joey P. Lum, Irvine, CA (US); Mark Liu Stevens, Laguna Hills, CA (US); Shinichi Yamamura, Irvine, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 1166 days.

This patent is subject to a terminal disclaimer.

(21) Appl. No.: 11/465,722

(22) Filed: Aug. 18, 2006

(65) Prior Publication Data

US 2006/0279475 A1   Dec. 14, 2006

Related U.S. Application Data

(63) Continuation of application No. 11/233,270, filed on Sep. 22, 2005, which is a continuation-in-part of application No. 10/962,248, filed on Oct. 8, 2004, and a continuation-in-part of application No. 10/961,793, filed on Oct. 8, 2004, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004.

(60) Provisional application No. 60/704,066, filed on Jul. 28, 2005.

(51) Int. Cl.
*G06F 3/12* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 3/00* (2006.01)
*G06K 15/00* (2006.01)

(52) U.S. Cl. .............. 358/1.15; 358/1.13; 358/1.16; 715/234; 715/235; 715/236; 715/273; 715/760

(58) Field of Classification Search .............. None
See application file for complete search history.

(56) References Cited

U.S. PATENT DOCUMENTS 5,085,587 A   2/1992   DesForges et al.
(Continued)

FOREIGN PATENT DOCUMENTS

EP   1160657   12/2001
(Continued)

OTHER PUBLICATIONS

F.D. Wright, Design Goals for an Internet Printing Protocol, Apr. 1999, pp. 1-43, http://tools.ietf.org/html/rfc2567.

(Continued)

*Primary Examiner* — Fan Zhang
(74) *Attorney, Agent, or Firm* — Krieger Intellectual Property, Inc.; Scott C. Krieger

(57) ABSTRACT

Embodiments of the present invention comprise systems, methods and devices for imaging device display standardization.

4 Claims, 18 Drawing Sheets

U.S. PATENT DOCUMENTS

| | | | |
|---|---|---|---|
| 5,228,100 | A | 7/1993 | Takeda et al. |
| 5,323,393 | A | 6/1994 | Barrett et al. |
| 5,365,494 | A | 11/1994 | Lynch |
| 5,410,646 | A | 4/1995 | Tondevold et al. |
| 5,504,589 | A | 4/1996 | Montague et al. |
| 5,513,112 | A | 4/1996 | Herring et al. |
| 5,542,031 | A | 7/1996 | Douglass et al. |
| 5,586,260 | A | 12/1996 | Hu |
| 5,659,845 | A | 8/1997 | Krist et al. |
| 5,664,206 | A | 9/1997 | Murow et al. |
| 5,671,412 | A | 9/1997 | Christiano |
| 5,699,493 | A | 12/1997 | Davidson, Jr. et al. |
| 5,699,494 | A | 12/1997 | Colbert et al. |
| 5,717,439 | A | 2/1998 | Levine et al. |
| 5,726,883 | A | 3/1998 | Levine et al. |
| 5,727,082 | A | 3/1998 | Sugishima |
| 5,727,135 | A | 3/1998 | Webb et al. |
| 5,745,712 | A | 4/1998 | Turpin et al. |
| 5,745,883 | A | 4/1998 | Krist et al. |
| 5,760,775 | A | 6/1998 | Sklut et al. |
| 5,774,678 | A | 6/1998 | Motoyama |
| 5,778,356 | A | 7/1998 | Heiny |
| 5,791,790 | A | 8/1998 | Bender et al. |
| 5,796,934 | A | 8/1998 | Bhanot et al. |
| 5,799,206 | A | 8/1998 | Kitagawa et al. |
| 5,799,289 | A | 8/1998 | Fukushima et al. |
| 5,812,818 | A | 9/1998 | Adler et al. |
| 5,832,264 | A | 11/1998 | Hart et al. |
| 5,848,231 | A | 12/1998 | Teitelbaum et al. |
| 5,877,776 | A | 3/1999 | Beaman et al. |
| 5,915,001 | A | 6/1999 | Uppaluru |
| 5,944,824 | A | 8/1999 | He |
| 5,956,487 | A | 9/1999 | Venkatraman et al. |
| 5,956,698 | A | 9/1999 | Lacheze et al. |
| 5,968,127 | A | 10/1999 | Kawabe et al. |
| 5,993,088 | A | 11/1999 | Nogay et al. |
| 5,995,553 | A | 11/1999 | Crandall et al. |
| 5,999,708 | A | 12/1999 | Kajita |
| 6,042,384 | A | 3/2000 | Loiacono |
| 6,044,382 | A | 3/2000 | Martino |
| 6,069,706 | A | 5/2000 | Kajita et al. |
| 6,075,860 | A | 6/2000 | Ketcham |
| 6,115,132 | A | 9/2000 | Nakatsuma et al. |
| 6,118,546 | A | 9/2000 | Sanchez et al. |
| 6,128,731 | A | 10/2000 | Zarrin et al. |
| 6,141,662 | A | 10/2000 | Jeyachandran |
| 6,148,346 | A | 11/2000 | Hanson |
| 6,161,139 | A | 12/2000 | Win et al. |
| 6,178,308 | B1 | 1/2001 | Bobrow et al. |
| 6,199,080 | B1 | 3/2001 | Nielsen |
| 6,213,652 | B1 | 4/2001 | Suzuki et al. |
| 6,216,113 | B1 | 4/2001 | Aikens et al. |
| 6,233,409 | B1 | 5/2001 | Haines et al. |
| 6,239,802 | B1 | 5/2001 | Lahey et al. |
| 6,240,456 | B1 | 5/2001 | Teng et al. |
| 6,246,487 | B1 | 6/2001 | Kobayashi et al. |
| 6,292,267 | B1 | 9/2001 | Mori et al. |
| 6,301,016 | B1 | 10/2001 | Matsueda et al. |
| 6,307,640 | B1 | 10/2001 | Motegi |
| 6,311,040 | B1 | 10/2001 | Kucinski et al. |
| 6,349,275 | B1 | 2/2002 | Schumacher et al. |
| 6,353,878 | B1 | 3/2002 | Dunham |
| 6,369,905 | B1 | 4/2002 | Mitsuhashi et al. |
| 6,407,820 | B1 | 6/2002 | Hansen et al. |
| 6,426,798 | B1 | 7/2002 | Yeung |
| 6,433,883 | B1 | 8/2002 | Kajita |
| 6,438,589 | B1 | 8/2002 | Iwata |
| 6,462,756 | B1 | 10/2002 | Hansen et al. |
| 6,476,926 | B1 | 11/2002 | Yano et al. |
| 6,490,547 | B1 | 12/2002 | Atkin et al. |
| 6,490,601 | B1 | 12/2002 | Markus et al. |
| 6,509,974 | B1 | 1/2003 | Hansen |
| 6,510,466 | B1 | 1/2003 | Cox et al. |
| 6,516,157 | B1 | 2/2003 | Maruta et al. |
| 6,526,258 | B2 | 2/2003 | Bejar et al. |
| 6,567,179 | B1 | 5/2003 | Sato et al. |
| 6,590,589 | B1 | 7/2003 | Sluiman et al. |
| 6,590,673 | B2 | 7/2003 | Kadowaki |
| 6,592,275 | B1 | 7/2003 | Aihara et al. |
| 6,597,469 | B1 | 7/2003 | Kuroyanagi |
| 6,604,157 | B1 | 8/2003 | Brusky et al. |
| 6,621,422 | B2 | 9/2003 | Rubenstein |
| 6,623,529 | B1 | 9/2003 | Lakritz |
| 6,636,929 | B1 | 10/2003 | Hascall et al. |
| 6,643,650 | B1 | 11/2003 | Slaughter et al. |
| 6,652,169 | B2 | 11/2003 | Parry |
| 6,685,637 | B1 | 2/2004 | Rom |
| 6,707,466 | B1 | 3/2004 | Van Sickle et al. |
| 6,721,286 | B1 | 4/2004 | Williams et al. |
| 6,735,773 | B1 | 5/2004 | Trinh et al. |
| 6,749,434 | B2 | 6/2004 | Stuppy |
| 6,772,945 | B2 | 8/2004 | Mahoney et al. |
| 6,775,729 | B1 | 8/2004 | Matsuo et al. |
| 6,823,225 | B1 | 11/2004 | Sass |
| 6,826,727 | B1 | 11/2004 | Mohr et al. |
| 6,836,623 | B2 | 12/2004 | Imai |
| 6,836,845 | B1 | 12/2004 | Lennie et al. |
| 6,850,252 | B1 | 2/2005 | Hoffberg |
| 6,854,839 | B2 | 2/2005 | Collier et al. |
| 6,862,110 | B2 | 3/2005 | Harrington |
| 6,862,583 | B1 | 3/2005 | Mazzagatte et al. |
| 6,865,716 | B1 | 3/2005 | Thurston |
| 6,873,429 | B2 | 3/2005 | Matsuura |
| 6,874,010 | B1 | 3/2005 | Sargent |
| 6,904,412 | B1 | 6/2005 | Broadbent et al. |
| 6,915,525 | B2 | 7/2005 | Ozawa |
| 6,934,706 | B1 | 8/2005 | Mancuso et al. |
| 6,934,740 | B1 | 8/2005 | Lawande et al. |
| 6,940,532 | B1 | 9/2005 | Fukui et al. |
| 6,948,175 | B1 | 9/2005 | Fong et al. |
| 6,951,303 | B2 | 10/2005 | Petersen et al. |
| 6,964,014 | B1 | 11/2005 | Parish |
| 6,975,820 | B2 | 12/2005 | Wong |
| 6,999,987 | B1 | 2/2006 | Billingsley et al. |
| 7,003,723 | B1 | 2/2006 | Kremer et al. |
| 7,007,026 | B2 | 2/2006 | Wilkinson et al. |
| 7,012,706 | B1 | 3/2006 | Hansen |
| 7,013,289 | B2 | 3/2006 | Horn et al. |
| 7,019,753 | B2 | 3/2006 | Rappaport et al. |
| 7,034,958 | B1 | 4/2006 | Hara |
| 7,072,057 | B1 | 7/2006 | Hansen |
| 7,079,143 | B2 | 7/2006 | Gilbert |
| 7,095,513 | B2 | 8/2006 | Stringham |
| 7,107,285 | B2 | 9/2006 | von Kaenel et al. |
| 7,107,615 | B2 | 9/2006 | Cossel et al. |
| 7,117,504 | B2 | 10/2006 | Smith et al. |
| 7,124,097 | B2 | 10/2006 | Claremont et al. |
| 7,126,717 | B2 | 10/2006 | Jeyachandran et al. |
| 7,127,700 | B2 | 10/2006 | Large |
| 7,136,909 | B2 | 11/2006 | Balasuriya |
| 7,136,941 | B2 | 11/2006 | Nguyen et al. |
| 7,143,364 | B1 | 11/2006 | Tam |
| 7,145,673 | B1 | 12/2006 | Lin |
| 7,145,686 | B2 | 12/2006 | Simpson et al. |
| 7,149,697 | B2 | 12/2006 | Zerza et al. |
| 7,149,964 | B1 | 12/2006 | Cottrille et al. |
| 7,162,103 | B2 | 1/2007 | Meunier et al. |
| 7,170,618 | B2 | 1/2007 | Fujitani et al. |
| 7,171,615 | B2 | 1/2007 | Jensen et al. |
| 7,174,056 | B2 | 2/2007 | Silverbrook et al. |
| 7,177,814 | B2 | 2/2007 | Gong et al. |
| 7,181,017 | B1 | 2/2007 | Nagel et al. |
| 7,181,442 | B2 | 2/2007 | Yeh et al. |
| 7,185,078 | B2 | 2/2007 | Pleyer et al. |
| 7,188,125 | B1 | 3/2007 | Karr |
| 7,188,181 | B1 | 3/2007 | Squier et al. |
| 7,191,391 | B2 | 3/2007 | Takashima |
| 7,191,393 | B1 | 3/2007 | Chin et al. |
| 7,197,615 | B2 | 3/2007 | Arakawa et al. |
| 7,203,699 | B2 | 4/2007 | Bellamy |
| 7,212,301 | B2 | 5/2007 | Treibach-H |
| 7,216,292 | B1 | 5/2007 | Snapper et al. |
| 7,216,347 | B1 | 5/2007 | Harrison et al. |
| 7,228,501 | B2 | 6/2007 | Brown et al. |
| 7,233,929 | B1 | 6/2007 | Lingle et al. |
| 7,233,973 | B2 | 6/2007 | Melet et al. |
| 7,234,110 | B2 | 6/2007 | Sumitomo |

| Patent/Pub No. | Date | Inventor |
|---|---|---|
| 7,239,409 B2 | 7/2007 | Parry |
| 7,249,100 B2 | 7/2007 | Murto et al. |
| RE39,808 E | 9/2007 | Motegi |
| 7,268,896 B2 | 9/2007 | Bellagamba et al. |
| 7,272,269 B2 | 9/2007 | Tojo et al. |
| 7,275,044 B2 | 9/2007 | Chauvin et al. |
| 7,284,061 B2 | 10/2007 | Matsubayashi et al. |
| 7,284,199 B2 | 10/2007 | Parasnis et al. |
| 7,293,034 B2 | 11/2007 | Paya et al. |
| 7,296,221 B1 | 11/2007 | Treibach-Heck et al. |
| 7,301,658 B2 | 11/2007 | Henry |
| 7,305,616 B1 | 12/2007 | Nelson et al. |
| 7,313,587 B1 | 12/2007 | Dharmarajan |
| 7,321,440 B2 | 1/2008 | Kimura |
| 7,325,196 B1 | 1/2008 | Covington et al. |
| 7,327,478 B2 | 2/2008 | Matsuda |
| 7,328,245 B1 | 2/2008 | Hull et al. |
| 7,340,389 B2 | 3/2008 | Vargas |
| 7,343,551 B1 | 3/2008 | Bourdev |
| 7,349,949 B1 | 3/2008 | Connor et al. |
| 7,363,586 B1 | 4/2008 | Briggs et al. |
| 7,397,362 B2 | 7/2008 | Zhang et al. |
| 7,404,204 B2 | 7/2008 | Davenport et al. |
| 7,406,660 B1 | 7/2008 | Sikchi et al. |
| 7,412,374 B1 | 8/2008 | Seiler et al. |
| 7,424,129 B2 | 9/2008 | Hull et al. |
| 7,437,406 B2 | 10/2008 | Hauduc et al. |
| 7,437,663 B2 | 10/2008 | Lakhdhir et al. |
| 7,441,188 B1 | 10/2008 | Russell et al. |
| 7,444,519 B2 | 10/2008 | Laferriere et al. |
| 7,444,590 B2 | 10/2008 | Christian et al. |
| 7,451,117 B2 | 11/2008 | Cozianu et al. |
| 7,451,392 B1 | 11/2008 | Chalecki et al. |
| 7,454,623 B2 | 11/2008 | Hardt |
| 7,467,211 B1 | 12/2008 | Herman et al. |
| 7,472,343 B2 | 12/2008 | Vasey |
| 7,478,171 B2 | 1/2009 | Ramaswamy et al. |
| 7,490,167 B2 | 2/2009 | Pena et al. |
| 7,496,837 B1 | 2/2009 | Larcheveque et al. |
| 7,500,178 B1 | 3/2009 | O'Donnell |
| 7,508,535 B2 | 3/2009 | Hart et al. |
| 7,509,649 B2 | 3/2009 | Shenfield |
| 7,545,528 B2 | 6/2009 | Takabayashi et al. |
| 7,548,334 B2 | 6/2009 | Lo et al. |
| 7,552,265 B2 | 6/2009 | Newman et al. |
| 7,565,554 B2 | 7/2009 | Joosten et al. |
| 7,567,360 B2 | 7/2009 | Takahashi et al. |
| 7,573,593 B2 | 8/2009 | Hart et al. |
| 7,599,942 B1 | 10/2009 | Mohamad |
| 7,657,557 B2 | 2/2010 | Super et al. |
| 7,729,363 B2 | 6/2010 | Shenfield et al. |
| 7,826,081 B2 | 11/2010 | Stevens et al. |
| 7,886,219 B2 | 2/2011 | Lund |
| 7,904,600 B2 | 3/2011 | Madril, Jr. et al. |
| 7,920,101 B2 | 4/2011 | Lum et al. |
| 7,941,743 B2 | 5/2011 | Reddy et al. |
| 7,941,744 B2 | 5/2011 | Oppenlander et al. |
| 7,975,214 B2 | 7/2011 | Boegelund et al. |
| 8,006,176 B2 | 8/2011 | Reddy et al. |
| 8,037,402 B2 | 10/2011 | Foushee, Jr. et al. |
| 8,049,677 B2 | 11/2011 | Lum et al. |
| 8,060,556 B2 | 11/2011 | Krane et al. |
| 2001/0021945 A1 | 9/2001 | Matsuura |
| 2001/0027439 A1 | 10/2001 | Holtzman et al. |
| 2001/0027527 A1 | 10/2001 | Khidekel et al. |
| 2001/0028808 A1 | 10/2001 | Nomura et al. |
| 2001/0038462 A1 | 11/2001 | Teeuwen et al. |
| 2001/0039614 A1 | 11/2001 | Hellberg et al. |
| 2001/0044787 A1 | 11/2001 | Shwartz et al. |
| 2002/0005984 A1 | 1/2002 | Donath et al. |
| 2002/0016921 A1 | 2/2002 | Olsen et al. |
| 2002/0020750 A1 | 2/2002 | Dymetman et al. |
| 2002/0029256 A1 | 3/2002 | Zintel et al. |
| 2002/0032745 A1 | 3/2002 | Honda |
| 2002/0049786 A1 | 4/2002 | Bibliowicz et al. |
| 2002/0052916 A1 | 5/2002 | Kloba et al. |
| 2002/0059265 A1 | 5/2002 | Valorose, III |
| 2002/0073148 A1 | 6/2002 | Haines et al. |
| 2002/0080381 A1 | 6/2002 | Haines |
| 2002/0089691 A1 | 7/2002 | Fertlitsch et al. |
| 2002/0093676 A1 | 7/2002 | Parry |
| 2002/0098027 A1 | 7/2002 | Koike et al. |
| 2002/0099796 A1 | 7/2002 | Chou |
| 2002/0103827 A1 | 8/2002 | Sesek |
| 2002/0105664 A1 | 8/2002 | Inoue et al. |
| 2002/0107939 A1 | 8/2002 | Ford et al. |
| 2002/0109718 A1 | 8/2002 | Mansour et al. |
| 2002/0112037 A1 | 8/2002 | Koss |
| 2002/0120792 A1 | 8/2002 | Blair et al. |
| 2002/0138279 A1 | 9/2002 | Al-Kazily et al. |
| 2002/0138476 A1 | 9/2002 | Suwa et al. |
| 2002/0138666 A1 | 9/2002 | Fujisawa |
| 2002/0145627 A1 | 10/2002 | Whitmarsh et al. |
| 2002/0147858 A1 | 10/2002 | Motoyama et al. |
| 2002/0152183 A1 | 10/2002 | Soares et al. |
| 2002/0152235 A1 | 10/2002 | Motoyama et al. |
| 2002/0152302 A1 | 10/2002 | Motoyama et al. |
| 2002/0156688 A1 | 10/2002 | Horn et al. |
| 2002/0156795 A1 | 10/2002 | Edwards et al. |
| 2002/0156846 A1 | 10/2002 | Rawat et al. |
| 2002/0171857 A1 | 11/2002 | Hisatomi et al. |
| 2002/0194180 A1 | 12/2002 | Alsop et al. |
| 2002/0194350 A1 | 12/2002 | Lu et al. |
| 2003/0002074 A1 | 1/2003 | Miyano |
| 2003/0007170 A1 | 1/2003 | Kajita et al. |
| 2003/0011633 A1 | 1/2003 | Conley et al. |
| 2003/0011640 A1 | 1/2003 | Green et al. |
| 2003/0014515 A1 | 1/2003 | Motoyama et al. |
| 2003/0014529 A1 | 1/2003 | Simpson et al. |
| 2003/0033369 A1 | 2/2003 | Bernhard |
| 2003/0035133 A1 | 2/2003 | Berkema et al. |
| 2003/0038965 A1 | 2/2003 | Simpson et al. |
| 2003/0043205 A1 | 3/2003 | Hill |
| 2003/0043396 A1 | 3/2003 | Klosterman et al. |
| 2003/0043405 A1 | 3/2003 | Hill |
| 2003/0048470 A1 | 3/2003 | Garcia |
| 2003/0048473 A1 | 3/2003 | Rosen |
| 2003/0049037 A1 | 3/2003 | Sadowara et al. |
| 2003/0053123 A1 | 3/2003 | Wu et al. |
| 2003/0063313 A1 | 4/2003 | Ito |
| 2003/0065766 A1 | 4/2003 | Parry |
| 2003/0065791 A1 | 4/2003 | Garg et al. |
| 2003/0065985 A1 | 4/2003 | McGeorge, Jr. |
| 2003/0074267 A1 | 4/2003 | Acharya et al. |
| 2003/0074312 A1 | 4/2003 | White |
| 2003/0081240 A1 | 5/2003 | Soto et al. |
| 2003/0084114 A1 | 5/2003 | Simpson et al. |
| 2003/0084302 A1 | 5/2003 | de Jong et al. |
| 2003/0088642 A1 | 5/2003 | Price et al. |
| 2003/0106021 A1 | 6/2003 | Mangrola |
| 2003/0123112 A1 | 7/2003 | Kajita et al. |
| 2003/0131110 A1 | 7/2003 | Chang et al. |
| 2003/0140053 A1 | 7/2003 | Vasey |
| 2003/0142351 A1 | 7/2003 | Sakura |
| 2003/0164987 A1 | 9/2003 | Enomoto et al. |
| 2003/0167336 A1 | 9/2003 | Iwamoto et al. |
| 2003/0174356 A1 | 9/2003 | Cherry et al. |
| 2003/0182632 A1 | 9/2003 | Murdock et al. |
| 2003/0184552 A1 | 10/2003 | Chadha |
| 2003/0184590 A1 | 10/2003 | Will |
| 2003/0184594 A1 | 10/2003 | Perkins et al. |
| 2003/0187922 A1 | 10/2003 | Ohara |
| 2003/0188193 A1 | 10/2003 | Venkataramappa |
| 2003/0188260 A1 | 10/2003 | Jensen et al. |
| 2003/0197883 A1 | 10/2003 | Lay et al. |
| 2003/0212982 A1 | 11/2003 | Brooks et al. |
| 2003/0225796 A1 | 12/2003 | Matsubara |
| 2003/0225829 A1 | 12/2003 | Pena et al. |
| 2003/0225894 A1 | 12/2003 | Ito |
| 2003/0231196 A1 | 12/2003 | Keohane et al. |
| 2003/0233437 A1 | 12/2003 | Kitada et al. |
| 2004/0003341 A1 | 1/2004 | alSafadi et al. |
| 2004/0008363 A1 | 1/2004 | Suzuki et al. |
| 2004/0012628 A1 | 1/2004 | Kropf et al. |
| 2004/0012644 A1 | 1/2004 | Allen et al. |
| 2004/0019705 A1 | 1/2004 | Ogura |
| 2004/0030693 A1 | 2/2004 | Toda |
| 2004/0034786 A1 | 2/2004 | Okamoto et al. |

| | | | | | | |
|---|---|---|---|---|---|---|
| 2004/0034807 A1 | 2/2004 | Rostowfske | | 2005/0091490 A1 | 4/2005 | Ogura |
| 2004/0039990 A1 | 2/2004 | Bakar et al. | | 2005/0091671 A1 | 4/2005 | Deem et al. |
| 2004/0044779 A1 | 3/2004 | Lambert | | 2005/0097458 A1 | 5/2005 | Wilson |
| 2004/0046789 A1 | 3/2004 | Inanoria | | 2005/0102616 A1 | 5/2005 | Thurston |
| 2004/0054573 A1 | 3/2004 | Shah et al. | | 2005/0108353 A1 | 5/2005 | Yamamoto |
| 2004/0061729 A1 | 4/2004 | Green et al. | | 2005/0114267 A1 | 5/2005 | Miwa et al. |
| 2004/0064759 A1 | 4/2004 | McGuire et al. | | 2005/0114658 A1 | 5/2005 | Dye et al. |
| 2004/0068693 A1 | 4/2004 | Rawat et al. | | 2005/0114766 A1 | 5/2005 | Yamamoto |
| 2004/0070606 A1 | 4/2004 | Yang et al. | | 2005/0119955 A1 | 6/2005 | Dang et al. |
| 2004/0080511 A1 | 4/2004 | Gilbert | | 2005/0129423 A1 | 6/2005 | Lester et al. |
| 2004/0080771 A1 | 4/2004 | Mihira et al. | | 2005/0131715 A1 | 6/2005 | Trethewey |
| 2004/0080778 A1 | 4/2004 | Ito et al. | | 2005/0138547 A1 | 6/2005 | Muhanna et al. |
| 2004/0088155 A1 | 5/2004 | Kerr et al. | | 2005/0149576 A1 | 7/2005 | Marmaros et al. |
| 2004/0093515 A1 | 5/2004 | Reeves, Jr. | | 2005/0152334 A1 | 7/2005 | Okamoto et al. |
| 2004/0098165 A1 | 5/2004 | Butikofer | | 2005/0185217 A1 | 8/2005 | Nishizawa et al. |
| 2004/0098316 A1 | 5/2004 | Philippe et al. | | 2005/0195221 A1 | 9/2005 | Berger et al. |
| 2004/0098595 A1 | 5/2004 | Aupperle et al. | | 2005/0203747 A1 | 9/2005 | Lecoeuche |
| 2004/0105104 A1 | 6/2004 | Ishikawa et al. | | 2005/0210399 A1 | 9/2005 | Filner et al. |
| 2004/0105122 A1 | 6/2004 | Schaeffer | | 2005/0223413 A1 | 10/2005 | Duggan et al. |
| 2004/0109028 A1 | 6/2004 | Stern et al. | | 2005/0231747 A1 | 10/2005 | Bledsoe et al. |
| 2004/0111670 A1* | 6/2004 | Sasakuma et al. ............ 715/513 | | 2005/0231755 A1 | 10/2005 | Araumi et al. |
| 2004/0113941 A1 | 6/2004 | Sliwa et al. | | 2005/0246428 A1 | 11/2005 | Araumi |
| 2004/0117358 A1 | 6/2004 | von Kaenel et al. | | 2005/0257134 A1 | 11/2005 | Goodman et al. |
| 2004/0117784 A1 | 6/2004 | Endoh | | 2005/0257148 A1 | 11/2005 | Goodman et al. |
| 2004/0122659 A1 | 6/2004 | Hourihane et al. | | 2005/0262440 A1 | 11/2005 | Stanciu et al. |
| 2004/0125403 A1 | 7/2004 | Furst et al. | | 2005/0265744 A1 | 12/2005 | Uruta |
| 2004/0128349 A1 | 7/2004 | Maruyama | | 2006/0004738 A1 | 1/2006 | Blackwell et al. |
| 2004/0130744 A1 | 7/2004 | Wu et al. | | 2006/0007480 A1 | 1/2006 | Yokokura |
| 2004/0130749 A1 | 7/2004 | Aoki | | 2006/0010180 A1 | 1/2006 | Kawamura et al. |
| 2004/0133525 A1 | 7/2004 | Singh et al. | | 2006/0015734 A1 | 1/2006 | Atobe |
| 2004/0150663 A1 | 8/2004 | Kim | | 2006/0028397 A1 | 2/2006 | O'Rourke |
| 2004/0158471 A1 | 8/2004 | Davis et al. | | 2006/0031411 A1 | 2/2006 | Gimson et al. |
| 2004/0161257 A1 | 8/2004 | Ishihara | | 2006/0038004 A1 | 2/2006 | Rielly et al. |
| 2004/0162076 A1 | 8/2004 | Chowdry et al. | | 2006/0041443 A1 | 2/2006 | Horvath |
| 2004/0165209 A1 | 8/2004 | Aoki et al. | | 2006/0045386 A1 | 3/2006 | Fukuoka et al. |
| 2004/0169881 A1 | 9/2004 | Sato | | 2006/0056873 A1 | 3/2006 | Kimura |
| 2004/0179229 A1 | 9/2004 | Laughlin | | 2006/0059434 A1 | 3/2006 | Boss et al. |
| 2004/0181747 A1 | 9/2004 | Hull et al. | | 2006/0064647 A1 | 3/2006 | Tapuska et al. |
| 2004/0187018 A1 | 9/2004 | Owen et al. | | 2006/0075251 A1 | 4/2006 | Correl et al. |
| 2004/0193678 A1 | 9/2004 | Trufinescu et al. | | 2006/0077119 A1 | 4/2006 | Zhang et al. |
| 2004/0199538 A1 | 10/2004 | Matsuda et al. | | 2006/0077411 A1 | 4/2006 | Mathieson et al. |
| 2004/0203358 A1 | 10/2004 | Anderson et al. | | 2006/0077413 A1 | 4/2006 | Lum et al. |
| 2004/0205118 A1 | 10/2004 | Yu | | 2006/0077414 A1 | 4/2006 | Lum et al. |
| 2004/0205533 A1 | 10/2004 | Lopata et al. | | 2006/0077423 A1 | 4/2006 | Mathieson et al. |
| 2004/0205620 A1 | 10/2004 | Nishikiori et al. | | 2006/0077426 A1 | 4/2006 | Lovat et al. |
| 2004/0212823 A1 | 10/2004 | Chavers et al. | | 2006/0077427 A1 | 4/2006 | Zhang et al. |
| 2004/0215671 A1 | 10/2004 | Hyakutake et al. | | 2006/0077428 A1 | 4/2006 | Lovat et al. |
| 2004/0221231 A1 | 11/2004 | Madril, Jr. et al. | | 2006/0077429 A1 | 4/2006 | Zhang et al. |
| 2004/0223778 A1 | 11/2004 | Zwiefelhofer | | 2006/0077430 A1 | 4/2006 | Zhang et al. |
| 2004/0226993 A1 | 11/2004 | Fulcher et al. | | 2006/0077431 A1 | 4/2006 | Zhang et al. |
| 2004/0227968 A1 | 11/2004 | Nakamura et al. | | 2006/0077432 A1 | 4/2006 | Lovat et al. |
| 2004/0230500 A1 | 11/2004 | Imago | | 2006/0077433 A1 | 4/2006 | Zhang et al. |
| 2004/0230637 A1 | 11/2004 | Lecoueche et al. | | 2006/0077434 A1 | 4/2006 | Zhang et al. |
| 2004/0236862 A1 | 11/2004 | Ito et al. | | 2006/0077435 A1 | 4/2006 | Lovat et al. |
| 2004/0254955 A1 | 12/2004 | Reese et al. | | 2006/0077436 A1 | 4/2006 | Zhang et al. |
| 2004/0255263 A1 | 12/2004 | Ando | | 2006/0077437 A1 | 4/2006 | Lovat et al. |
| 2004/0261010 A1 | 12/2004 | Matsuishi | | 2006/0077438 A1 | 4/2006 | Lovat et al. |
| 2004/0268229 A1 | 12/2004 | Paoli et al. | | 2006/0077439 A1 | 4/2006 | Yamamura et al. |
| 2004/0268306 A1 | 12/2004 | Cheng et al. | | 2006/0077440 A1 | 4/2006 | Stevens et al. |
| 2005/0005094 A1 | 1/2005 | Jamieson et al. | | 2006/0077442 A1 | 4/2006 | Lum et al. |
| 2005/0009187 A1 | 1/2005 | Shinozaki et al. | | 2006/0077443 A1 | 4/2006 | Lum et al. |
| 2005/0015472 A1 | 1/2005 | Catania et al. | | 2006/0077444 A1 | 4/2006 | Lum et al. |
| 2005/0015585 A1 | 1/2005 | Kurose | | 2006/0077445 A1 | 4/2006 | Yamamura et al. |
| 2005/0022112 A1 | 1/2005 | Kato | | 2006/0077446 A1 | 4/2006 | Lum et al. |
| 2005/0026593 A1 | 2/2005 | Anderson et al. | | 2006/0077447 A1 | 4/2006 | Sojian et al. |
| 2005/0028086 A1 | 2/2005 | Itavaara et al. | | 2006/0077448 A1 | 4/2006 | Plewnia et al. |
| 2005/0044248 A1 | 2/2005 | Mihira et al. | | 2006/0077449 A1 | 4/2006 | Lum et al. |
| 2005/0055475 A1 | 3/2005 | MacKay et al. | | 2006/0077450 A1 | 4/2006 | Reddy et al. |
| 2005/0057560 A1 | 3/2005 | Bibr et al. | | 2006/0077451 A1 | 4/2006 | Nguyen et al. |
| 2005/0060046 A1* | 3/2005 | Ito et al. .............. 700/17 | | 2006/0077452 A1 | 4/2006 | Nguyen et al. |
| 2005/0060564 A1 | 3/2005 | Murakami et al. | | 2006/0077453 A1 | 4/2006 | Plewnia et al. |
| 2005/0063010 A1 | 3/2005 | Giannetti | | 2006/0077454 A1 | 4/2006 | Lum et al. |
| 2005/0068581 A1 | 3/2005 | Hull et al. | | 2006/0078345 A1 | 4/2006 | Lovat et al. |
| 2005/0071507 A1 | 3/2005 | Ferlitsch | | 2006/0078346 A1 | 4/2006 | Lovat et al. |
| 2005/0071746 A1 | 3/2005 | Hart et al. | | 2006/0080123 A1 | 4/2006 | Plewnia |
| 2005/0076291 A1 | 4/2005 | Yee et al. | | 2006/0080124 A1 | 4/2006 | Plewnia |
| 2005/0080649 A1 | 4/2005 | Alvarez et al. | | 2006/0080129 A1 | 4/2006 | Reddy et al. |
| 2005/0086584 A1 | 4/2005 | Sampathkumar et al. | | 2006/0080184 A1 | 4/2006 | Zhang et al. |
| 2005/0091087 A1 | 4/2005 | Smith et al. | | 2006/0080185 A1 | 4/2006 | Lovat et al. |

| | | | | | |
|---|---|---|---|---|---|
| 2006/0080731 | A1 | 4/2006 | Zhang et al. | JP | 2002351644 | 12/2002 |
| 2006/0085430 | A1 | 4/2006 | Yamamura et al. | JP | 2003022258 | 1/2003 |
| 2006/0085835 | A1 | 4/2006 | Istvan et al. | JP | 2003050781 | 2/2003 |
| 2006/0086788 | A1 | 4/2006 | Zhang et al. | JP | 2003157155 A | 5/2003 |
| 2006/0090128 | A1 | 4/2006 | Reddy et al. | JP | 2003178023 | 6/2003 |
| 2006/0092097 | A1 | 5/2006 | Reddy et al. | JP | 2003196554 A | 7/2003 |
| 2006/0095541 | A1 | 5/2006 | Sojian et al. | JP | 2003198792 | 7/2003 |
| 2006/0095542 | A1 | 5/2006 | Reddy et al. | JP | 2003208484 | 7/2003 |
| 2006/0103588 | A1 | 5/2006 | Chrisop et al. | JP | 2003209644 | 7/2003 |
| 2006/0103873 | A1 | 5/2006 | Reddy et al. | JP | 2003216368 | 7/2003 |
| 2006/0107197 | A1 | 5/2006 | Friend et al. | JP | 2003216395 A | 7/2003 |
| 2006/0107212 | A1 | 5/2006 | Lovat et al. | JP | 2003223299 | 8/2003 |
| 2006/0107224 | A1 | 5/2006 | Friend et al. | JP | 2003260853 | 9/2003 |
| 2006/0112123 | A1 | 5/2006 | Clark et al. | JP | 2003281227 | 10/2003 |
| 2006/0117257 | A1 | 6/2006 | Hasson et al. | JP | 2003288179 | 10/2003 |
| 2006/0119883 | A1 | 6/2006 | Lovat et al. | JP | 2003308195 | 10/2003 |
| 2006/0154227 | A1 | 7/2006 | Rossi et al. | JP | 200430448 | 1/2004 |
| 2006/0162076 | A1 | 7/2006 | Bartlett et al. | JP | 2004074530 | 3/2004 |
| 2006/0165105 | A1 | 7/2006 | Shenfield et al. | JP | 2004088561 | 3/2004 |
| 2006/0168355 | A1 | 7/2006 | Shenfield et al. | JP | 2004094313 | 3/2004 |
| 2006/0174196 | A1 | 8/2006 | Zhang et al. | JP | 2004128561 | 4/2004 |
| 2006/0184522 | A1 | 8/2006 | McFarland et al. | JP | 2004118549 | 5/2004 |
| 2006/0198653 | A1 | 9/2006 | Plewnia et al. | JP | 2004164157 A | 6/2004 |
| 2006/0200748 | A1 | 9/2006 | Shenfield | JP | 2004185396 | 7/2004 |
| 2006/0200749 | A1 | 9/2006 | Shenfield | JP | 2004213356 | 7/2004 |
| 2006/0221941 | A1 | 10/2006 | Kishinsky et al. | JP | 2004215309 | 7/2004 |
| 2006/0224405 | A1 | 10/2006 | White et al. | JP | 2004222247 | 8/2004 |
| 2006/0235742 | A1 | 10/2006 | Castellanos et al. | JP | 2004228686 | 8/2004 |
| 2006/0277286 | A1 | 12/2006 | Zhang et al. | JP | 2004228687 | 8/2004 |
| 2006/0279474 | A1 | 12/2006 | Lum et al. | JP | 2004240752 | 8/2004 |
| 2006/0279475 | A1 | 12/2006 | Lum et al. | JP | 2004246771 | 9/2004 |
| 2007/0022180 | A1 | 1/2007 | Cocotis et al. | JP | 2004310326 | 11/2004 |
| 2007/0041035 | A1 | 2/2007 | Sembower et al. | JP | 2004310516 | 11/2004 |
| 2007/0061129 | A1 | 3/2007 | Barreiro | JP | 2004276271 | 12/2004 |
| 2007/0078805 | A1 | 4/2007 | Reddy et al. | JP | 2004358800 | 12/2004 |
| 2007/0089049 | A1 | 4/2007 | Gormish et al. | JP | 2005014591 | 1/2005 |
| 2007/0091010 | A1 | 4/2007 | Richardson et al. | JP | 2005033460 | 2/2005 |
| 2007/0094103 | A1 | 4/2007 | Hyakutake et al. | JP | 2005059496 | 3/2005 |
| 2007/0146823 | A1 | 6/2007 | Borchers et al. | JP | 2005070979 | 3/2005 |
| 2007/0147610 | A1 | 6/2007 | Kethi Reddy | JP | 2005078278 | 3/2005 |
| 2007/0173266 | A1 | 7/2007 | Barnes | JP | 2005084891 | 3/2005 |
| 2007/0174894 | A1 | 7/2007 | Matsunaga | JP | 2005115543 | 4/2005 |
| 2007/0186150 | A1 | 8/2007 | Rao et al. | JP | 2005004243 | 6/2005 |
| 2007/0201654 | A1 | 8/2007 | Shenfield | JP | 2005209059 | 8/2005 |
| 2007/0201655 | A1 | 8/2007 | Shenfield | JP | 2005219440 A | 8/2005 |
| 2007/0226608 | A1 | 9/2007 | Virk et al. | JP | 2005235034 A | 9/2005 |
| 2007/0233902 | A1 | 10/2007 | Trefler et al. | JP | 2005269250 | 9/2005 |
| 2007/0283274 | A1 | 12/2007 | Mettifogo | JP | 2006053905 | 2/2006 |
| 2007/0291293 | A1 | 12/2007 | Bellagamba et al. | JP | 2006140898 | 6/2006 |
| 2008/0022267 | A1 | 1/2008 | Johnson et al. | JP | 10240490 | 9/2998 |
| 2008/0046806 | A1 | 2/2008 | Reddy et al. | WO | WO0118754 A1 | 3/2001 |
| 2008/0072162 | A1 | 3/2008 | Dauerer et al. | WO | WO01/33381 | 5/2001 |
| 2008/0155396 | A1 | 6/2008 | Dubinko et al. | WO | WO0198864 | 12/2001 |
| 2008/0162116 | A1 | 7/2008 | Briggs et al. | | | |

FOREIGN PATENT DOCUMENTS

| | | |
|---|---|---|
| JP | 09160441 | 12/1995 |
| JP | 08234945 | 9/1996 |
| JP | O9293036 | 11/1997 |
| JP | O9330190 | 12/1997 |
| JP | 10013695 | 1/1998 |
| JP | 10154190 A | 6/1998 |
| JP | 10269184 | 10/1998 |
| JP | 2000112691 | 4/2000 |
| JP | 2000174949 | 6/2000 |
| JP | 2000207108 | 7/2000 |
| JP | 2000207108 A * | 7/2000 |
| JP | 2002259071 | 2/2001 |
| JP | 2001268296 | 9/2001 |
| JP | 200284383 | 3/2002 |
| JP | 2002140195 | 5/2002 |
| JP | 2002171380 | 6/2002 |
| JP | 2002175195 | 6/2002 |
| JP | 2002221877 | 8/2002 |
| JP | 2002236830 | 8/2002 |
| JP | 2002298049 A | 10/2002 |
| JP | 2002312148 | 10/2002 |
| JP | 2002324049 | 11/2002 |
| JP | 2002330253 | 11/2002 |

OTHER PUBLICATIONS

R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).

T. Hastings, "Internet Printing Protocol/1.1: Model and Semantics" (Sep. 2000, retrieved from http://www.ietf.org/rfc/rfc291.txt on Sep. 18, 2008, pp. 1-210).

R. Herriot, Internet Printing Protocol (IPP): Event Notifications and Subscriptions, Jun. 21, 2004, http://tools.ietf.org/html/draft-ietf-ipp-not-spec-12, pp. 1-98.

Microsoft Corporation. Microsoft Computer Dictionary, Fifth Edition, 2002 Microsoft Press, pp. 487-488.

Gaedke, Martin et al. "A Modeling Approach to Federated Identity and Access Management", May 2005 ACM.

Foldoc. "relational database", Jun. 2002, retrieved from <http://foldoc.org/index.cgi?query=relational+database>.

OASIS. "Security Assertion Markup Language (SAML) 2.0 Technical Overview", Working Draft 01, Jul. 22, 2004, <http://www.oasis-open.org/committees/documents.php?wg_abbrev=security>.

Hartman, Bret et al. Mastering Web Services Security, 2003 Wiley Publishing, Inc., pp. 36-46.

U.S. Appl. No. 10/962,248—Office Action dated Aug. 19, 2008.

U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Ratha, N.K., Connell, J.H., Bolle, R.M. "Enhancing security and privacy in biometrics-based authentication systems". IBM Systems Journal 40(3), pp. 614-634 (2001).
U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non-Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.

U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non- Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.
U.S. Appl. No. 11/562,342—Non-Final Office Action dated May 29, 2009.
U.S. Appl. No. 11/562,342—Final Office Action dated Dec. 21, 2009.
U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Foreign Patent App. No. JP2006205150—Office Action filed for a related foreign application dated Sep. 28, 2010 corresponding to U.S. Appl. No. 11/192,500.
Foreign Patent App. No. JP2006207198—Office Action filed for a related foreign application dated Sep. 21, 2010 corresponding to U.S. Appl. No. 11/192,836.
Foreign Patent App. No. JP2006256441—Office Action filed for a related foreign application dated Nov. 9, 2010 corresponding to U.S. Appl. No. 11/233,202.
U.S. Appl. No. 10/961,793—Non-Final Office Action dated Oct. 28, 2010.
U.S. Appl. No. 10/961,911—Final Office Action dated Oct. 20, 2010.
U.S. Appl. No. 11/073,055—Non-Final Office Action dated Nov. 23, 2010.
U.S. Appl. No. 11/233,270—Notice of Allowance dated Nov. 30, 2010.
U.S. Appl. No. 11/241,010—Final Office Action dated Oct. 15, 2010.
U.S. Appl. No. 11/240,156—Non-Final Office Action dated Nov. 10, 2010.
U.S. Appl. No. 11/256,479—Non-Final Office Action dated Nov. 23, 2010.
U.S. Appl. No. 11/193,152—Non-Final Office Action dated Mar. 1, 2010.
U.S. Appl. No. 11/193,152—Final Office Action dated Nov. 18, 2010.
U.S. Appl. No. 11/193,151—Non-Final Office Action dated Mar. 29, 2010.
U.S. Appl. No. 11/193,151—Final Office Action dated Nov. 2, 2010.
U.S. Appl. No. 11/192,824—Final Office Action dated Oct. 22, 2010.
U.S. Appl. No. 11/465,747—Final Office Action dated Mar. 9, 2010.
U.S. Appl. No. 11/241,447—Non-Final Office Action dated Dec. 8, 2010.
U.S. Appl. No. 11/193,076—Final Office Action dated Jan. 6, 2011.
U.S. Appl. No. 11/192,630—Final Office Action dated Dec. 8, 2010.
U.S. Appl. No. 11/192,868—Final Office Action dated Dec. 8, 2010.
U.S. Appl. No. 11/193,188—Final Office Action dated Dec. 8, 2010.
U.S. Appl. No. 11/192,615—Non-Final Office Action dated Jan. 4, 2011.
U.S. Appl. No. 11/192,467—Notice of Allowance dated Dec. 22, 2010.
U.S. Appl. No. 11/465,747—Notice of Allowance dated Dec. 28, 2010.
Foreign Patent App. No. JP2006256440—Office Action filed for a related foreign application dated Oct. 19, 2010 corresponding to U.S. Appl. No. 11/233,270.
Foreign Patent App. No. JP2006261563—Interrogation Report filed for a related foreign application dated Jun. 7, 2011 corresponding to U.S. Appl. No. 11/241,501.
Foreign Patent App. No. JP2006207200—Interrogation Report filed for a related foreign application dated Mar. 8, 2011 corresponding to U.S. Appl. No. 11/192,615.
U.S. Appl. No. 10/961,594—Final Office Action dated May 19, 2011.
U.S. Appl. No. 11/232,827—Non-Final Office Action dated May 26, 2011.
U.S. Appl. No. 11/073,055—Final Office Action dated Mar. 30, 2011.
U.S. Appl. No. 11/233,202—Final Office Action dated Mar. 23, 2011.
U.S. Appl. No. 11/465,699—Non-Final Office Action dated Mar. 23, 2011.
U.S. Appl. No. 11/241,011—Non-Final Office Action dated Feb. 17, 2011.
U.S. Appl. No. 11/192,617—Non-Final Office Action dated Jun. 9, 2011.
U.S. Appl. No. 11/192,546—Non-Final Office Action dated Feb. 17, 2011.
U.S. Appl. No. 11/192,862—Final Office Action dated Mar. 21, 2011.

U.S. Appl. No. 11/192,870—Non-Final Office Action dated Feb. 22, 2011.
U.S. Appl. No. 11/192,616—Non-Final Office Action dated Jun. 9, 2011.
U.S. Appl. No. 11/192,500—Final Office Action dated Mar. 21, 2011.
U.S. Appl. No. 11/193,151—Non-Final Office Action dated Mar. 16, 2011.
U.S. Appl. No. 11/192,824—Non-Final Office Action dated Jun. 9, 2011.
U.S. Appl. No. 11/192,547—Final Office Action dated Mar. 7, 2011.
U.S. Appl. No. 11/465,752—Non-Final Office Action dated Apr. 1, 2011.
U.S. Appl. No. 11/241,320—Non-Final Office Action dated Jun. 9, 2011.
U.S. Appl. No. 11/240,139—Non-Final Office Action dated Jun. 10, 2011.
U.S. Appl. No. 11/240,084—Non-Final Office Action dated May 12, 2011.
U.S. Appl. No. 11/536,115—Final Office Action dated Mar. 10, 2011.
U.S. Appl. No. 11/218,033—Non-Final Office Action dated Jun. 9, 2011.
U.S. Appl. No. 11/218,186—Non-Final Office Action dated Jun. 16, 2011.
U.S. Appl. No. 10/962,248—Notice of Allowance dated Apr. 1, 2011.
U.S. Appl. No. 10/961,793—Notice of Allowance dated Jun. 10, 2011.
U.S. Appl. No. 10/962,103—Notice of Allowance dated Feb. 22, 2011.
U.S. Appl. No. 11/233,201—Notice of Allowance dated Jun. 24, 2011.
U.S. Appl. No. 11/241,501—Notice of Allowance dated Feb. 17, 2011.
U.S. Appl. No. 11/241,010—Notice of Allowance dated May 27, 2011.
U.S. Appl. No. 11/241,071—Notice of Allowance dated May 3, 2011.
U.S. Appl. No. 11/241,447—Notice of Allowance dated Jul. 13, 2011.
U.S. Appl. No. 11/241,498—Notice of Allowance dated Apr. 1, 2011.
U.S. Appl. No. 11/240,156—Notice of Allowance dated Jul. 12, 2011.
U.S. Appl. No. 11/256,479—Notice of Allowance dated Jul. 13, 2011.
U.S. Appl. No. 11/192,630—Notice of Allowance dated May 31, 2011.
U.S. Appl. No. 11/192,865—Notice of Allowance dated May 19, 2011.
U.S. Appl. No. 11/192,868—Notice of Allowance dated Apr. 29, 2011.
U.S. Appl. No. 11/193,152—Notice of Allowance dated Apr. 8, 2011.
U.S. Appl. No. 11/192,629—Notice of Allowance dated Apr. 11, 2011.
U.S. Appl. No. 11/192,824—Notice of Allowance dated Apr. 20, 2011.
U.S. Appl. No. 11/256,493—Notice of Allowance dated Apr. 15, 2011.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.
U.S. Appl. No. 11/218,033—Final Office Action dated May 14, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.

U.S. Appl. No. 11/233,201—Non-Final Office Action dated Sep. 15, 2010.
U.S. Appl. No. 11/232,552—Final Office Action dated Aug. 19, 2010.
U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.
Foreign Patent App. No. JP2006205159—Japanese Office Action filed for a related foreign application dated Sep. 27, 2011 corresponding to U.S. Appl. No. 11/192,500.
U.S. Appl. No. 11/232,552—Final Office Action dated Aug. 5, 2011.
U.S. Appl. No. 11/192,862—Non- Final Office Action dated Oct. 13, 2011.
U.S. Appl. No. 11/192,870—Final Office Action dated Aug. 8, 2011.
U.S. Appl. No. 11/192,500—Non-Final Office Action dated Sep. 30, 2011.
U.S. Appl. No. 11/192,615—Final Office Action dated Oct. 11, 2011.
U.S. Appl. No. 11/465,752—Final Office Action dated Oct. 31, 2011.
U.S. Appl. No. 10/961,594—Notice of Allowance dated Oct. 13, 2011.
U.S. Appl. No. 11/465,699—Notice of Allowance dated Sep. 30, 2011.
U.S. Appl. No. 11/241,011—Notice of Allowance dated Sep. 6, 2011.
U.S. Appl. No. 11/192,617—Notice of Allowance dated Oct. 11, 2011.
U.S. Appl. No. 11/193,076—Notice of Allowance dated Oct. 11, 2011.
U.S. Appl. No. 11/192,546—Notice of Allowance dated Aug. 30, 2011.
U.S. Appl. No. 11/192,616—Notice of Allowance dated Oct. 11, 2011.
U.S. Appl. No. 11/193,151—Notice of Allowance dated Aug. 22, 2011.
U.S. Appl. No. 11/241,320—Notice of Allowance dated Oct. 11, 2011.
U.S. Appl. No. 11/240,139—Notice of Allowance dated Oct. 11, 2011.
U.S. Appl. No. 11/240,084—Notice of Allowance dated Oct. 11, 2011.
U.S. Appl. No. 11/218,033—Notice of Allowance dated Oct. 11, 2011.
U.S. Appl. No. 11/218,186—Notice of Allowance dated Oct. 11, 2011.
Canon USA, Inc.; MEAP Multifunctional Embedded Application Platform; Aug. 2004; http://developersupport.canon.com/Web__MEAP__Presentation.pdf.
XEROX, Inc.; XEROX FreeFlow digital workflow collection; 2003; http://www.xerox.com/downloads/usa/en/s/solutions__digital__workflow__whitepaper__sdk.pdf.
Ricoh Company, Ltd.; Ricoh's Medium-Term Management Plan; Mar. 19, 2002; http://www.ricoh.com/IR/data/pre/pdf/ir__pre2002.pdf.
Ricoh Company, Ltd.; White Paper: Embedded Software Architecture SDK; Jun. 25, 2003; http://www.ricoh-usa.com/products/concept/esa.asp?catname=ESA.
Hewlett-Packard Company; JetCAPS Scan2Folder; 2003; http://www.jetcaps.se/resources/datasheets/ds__scan2folder.pdf.
Hewlett-Packard Company; JetCAPS chai applications; Dec. 9, 2002; http://www.stethos.com/chai/data/d__us__chai.pdf.
U.S. Appl. No. 11/232,827—Notice of Allowance dated Dec. 1, 2011.
U.S. Appl. No. 11/073,055—Non-final Office Action dated Feb. 2, 2012.
U.S. Appl. No. 11/232,552—Notice of Allowance dated Jan. 20, 2012.
U.S. Appl. No. 11/465,752—Notice of Allowance dated Feb. 14, 2012.
U.S. Appl. No. 11/536,115—Non-final Office Action dated Feb. 24, 2012.

* cited by examiner

METHODS AND SYSTEMS FOR INTEGRATING IMAGING DEVICE DISPLAY CONTENT

RELATED REFERENCES

This application is a continuation of U.S. patent application Ser. No. 11/233,270, entitled "Methods and Systems for Imaging Device Display Standardization," filed on Sep. 22, 2005 which is a continuation-in-part of:

U.S. patent application Ser. No. 10/962,248, entitled "Methods and Systems for Imaging Device Remote Application Interaction," filed on Oct. 8, 2004;

U.S. patent application Ser. No. 10/961,793, entitled "Methods and Systems for Imaging Device Remote Form Management," filed on Oct. 8, 2004;

U.S. patent application Ser. No. 10/961,911, entitled "Methods and Systems for Imaging Device Remote Location Functions," filed on Oct. 8, 2004;

U.S. patent application Ser. No. 10/961,594, entitled "Methods and Systems for Imaging Device Remote document Management," filed on Oct. 8, 2004;

U.S. patent application Ser. No. 10/962,103, entitled "Methods and Systems for Imaging Device Document Translation," filed on Oct. 8, 2004;

and which claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for integrating imaging device display content.

BACKGROUND OF THE INVENTION

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

Embodiments of the present invention comprise methods and systems for imaging device display standardization.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
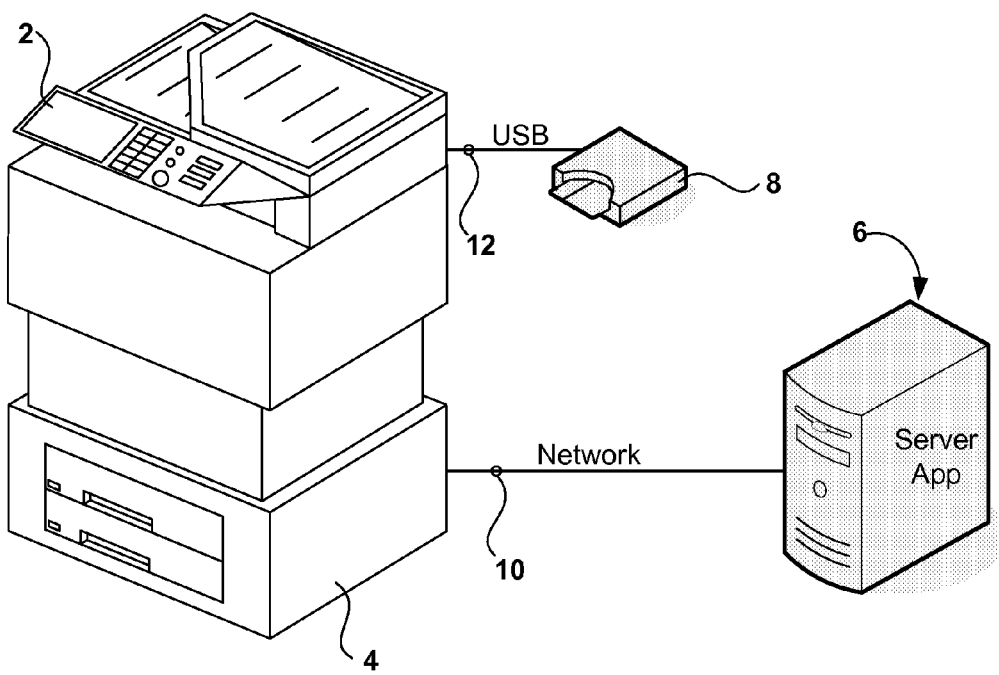
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
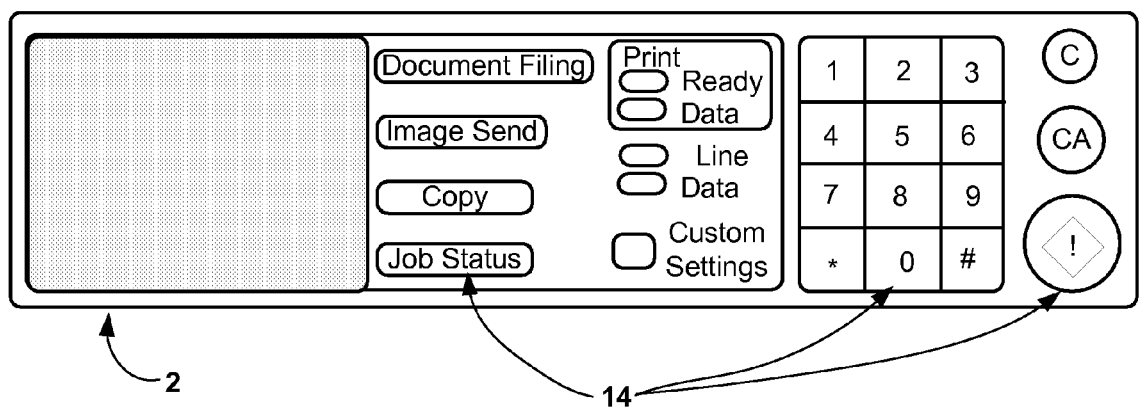
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 12, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device—standard Job Status screens | Job Status |
| Custom Settings | Device—standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

| Device Functions | |
| --- | --- |
| Enable/Disable | Description |
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
|---|---|---|---|---|---|---|---|
| JOB Characteristics | | | | | | | |
| Job Mode | Yes | Yes | Yes | Yes | Yes | Yes | Yes |
| Broadcast | No | No | Yes | Yes | Yes | Yes | No |
| Manage No. | | | | | | | |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1—Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide a remote computing device with the following controls:

Mass storage control—an RCD application can retrieve mass storage status information including storage capacity, space available, and write-protect mode plus modify write-protect status.

Resource list—an RCD application can retrieve a list of stored fonts and forms including font or macro ID, font number, font/form name, escape sequence, and file size.

Download resource—an RCD application can download PCL fonts, PCL macros, and PS fonts and forms. Any special processing that is performed when a resource is downloaded via the web pages will also be performed when the resource is downloaded via Open Systems.

Delete resource—an RCD application can delete any resource stored in mass storage.

Upload resources—an RCD application can upload an individual or all resources. On devices where effective memory management is unavailable, a server application can use this function to "defrag" mass storage.

Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application can retrieve the current firmware version numbers.

Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update firmware—an RCD can download an updated firmware version to the device. If a reboot is necessary, the IDev will perform it automatically when download is complete.

Download status—the IDev will send a status notification (success/error) to an RCD after firmware download.

Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application can get and set values for the following scan and fax parameters:
COLOR OR B/W
IMAGE MODE—TEXT, TEXT/PHOTO, PHOTO; EXPOSURE LEVEL
RESOLUTION
FILE FORMAT—FILE TYPE, COMPRESSION, AND PAGES PER FILE
ORIGINAL—ORIGINAL SIZE, SIMPLEX/DUPLEX, ROTATE, AND JOB BUILD
FILENAME
SUBJECT
MESSAGE
SENDER
SCHEDULE SEND TIME
PAGE DIVISION (BOOK SCANNING)
COVER PAGE
TRANSMISSION MESSAGE (CONFIDENTIAL, URGENT, ETC.)
THIN PAPER SCANNING
DESTINATION
DOCUMENT FILING Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application can get and set values for the following copy parameters:
COLOR OR B/W
EXPOSURE—TEXT, TEXT/PHOTO, PHOTO, SUPER PHOTO; EXPOSURE LEVEL
PAPER SELECT (BY TRAY)
COPY RATIO
2-SIDED COPY—1TO1, 1TO2, 2TO2, 2TO1; BINDING EDGE
OUTPUT—OUTPUT TRAY, SORT, STAPLE, GROUP, OFFSET
ORIGINAL SIZE
SPECIAL FUNCTIONS—MARGIN SHIFT, ERASE, PAMPHLET, ETC.
DOCUMENT FILING Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:
EXPOSURE
RESOLUTION ORIGINAL—SIZE, SIMPLEX/DUPLEX
FILE INFORMATION—USERNAME, FILENAME, FOLDER, CONFIDENTIAL, password
SPECIAL MODES—ERASE, DUAL PAGE COPY, 2IN1, JOB BUILD, CARD SHOT Initiate Print—the remote computing device application can select a stored file and initiate a print including the following parameters:
PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING Initiate Send—the remote computing device application can select a stored file and initiate a send including the following parameters:
RESOLUTION
FILE FORMAT
DESTINATION
TIMER
SENDER
FILENAME
SUBJECT
MESSAGE Security Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

Figure 3:
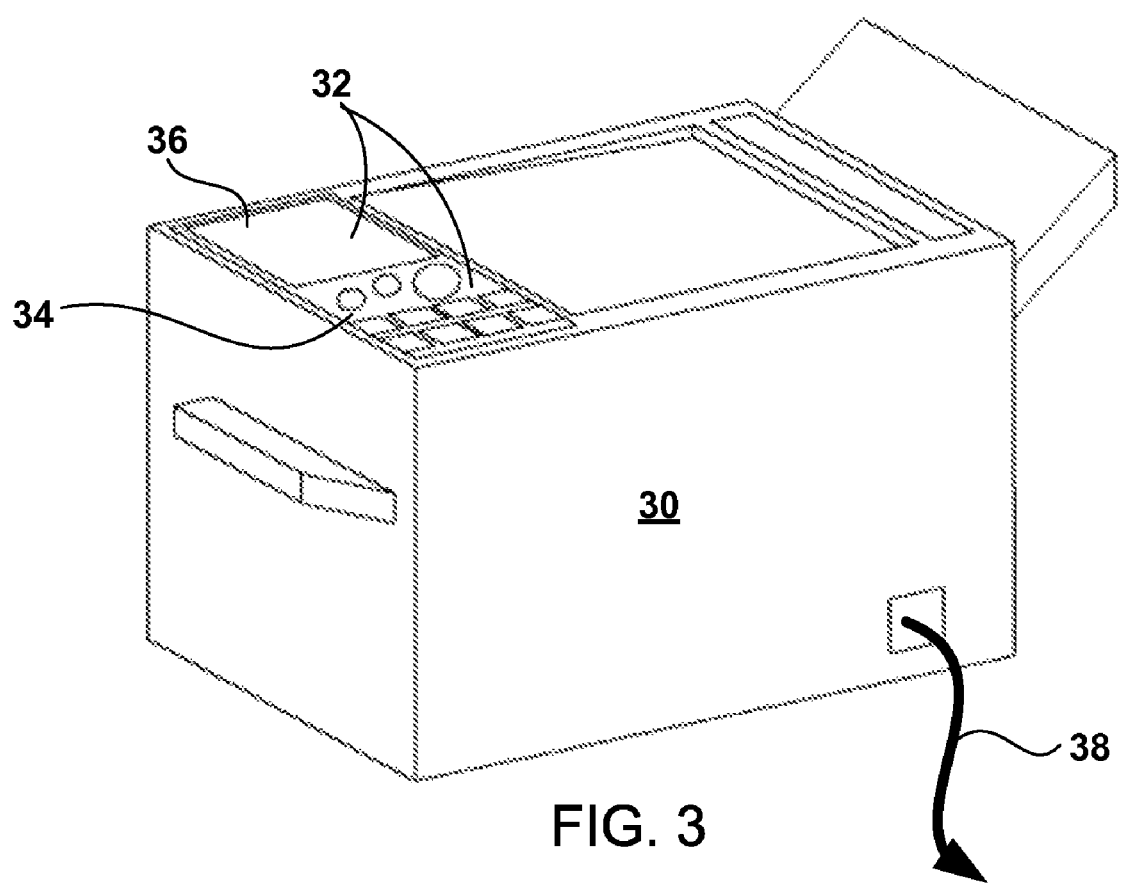
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11(b) compliant connection, a Bluetooth connection, an Infrared Data Association (IrDA) connection or some other wireless connection.

Figure 4:
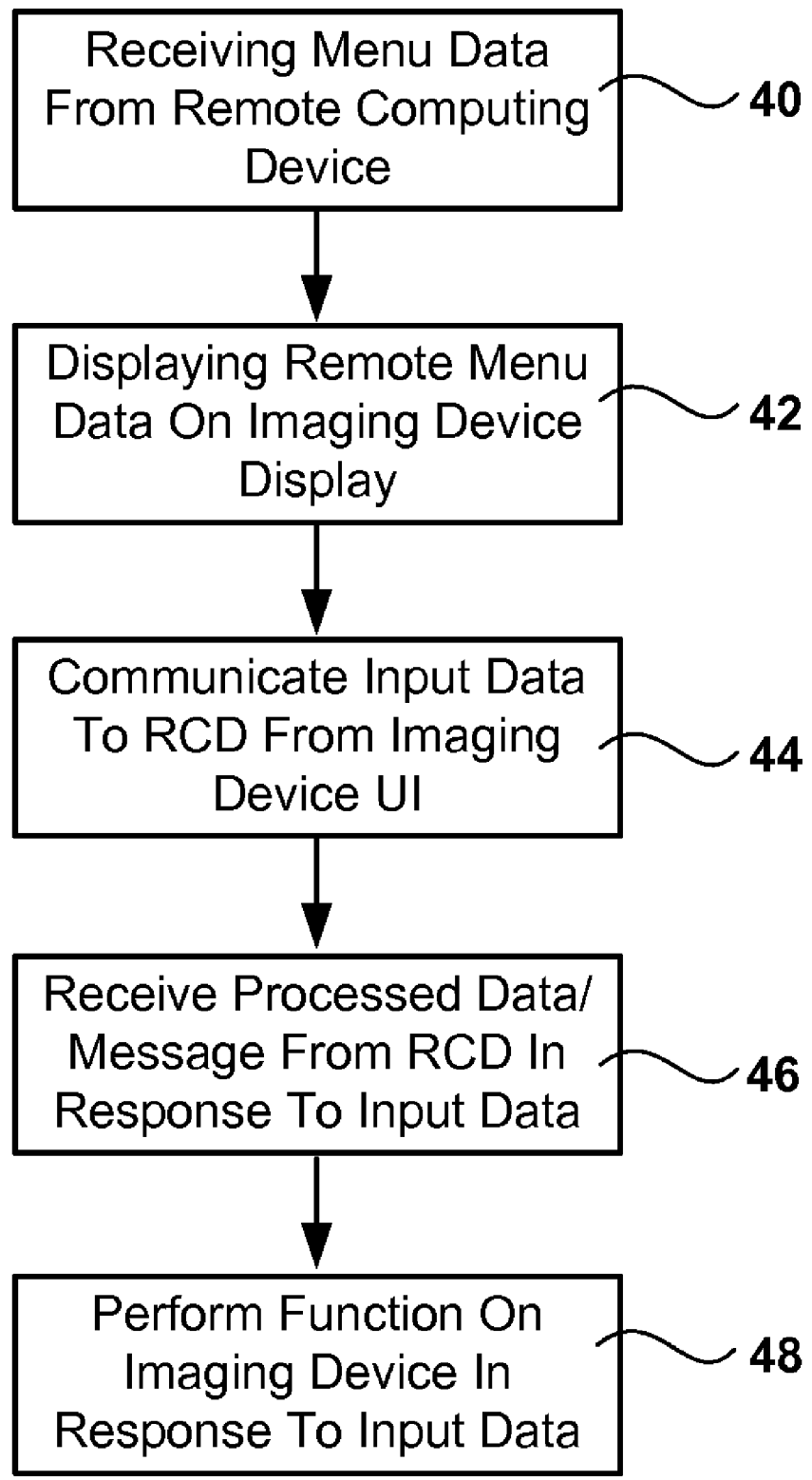
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
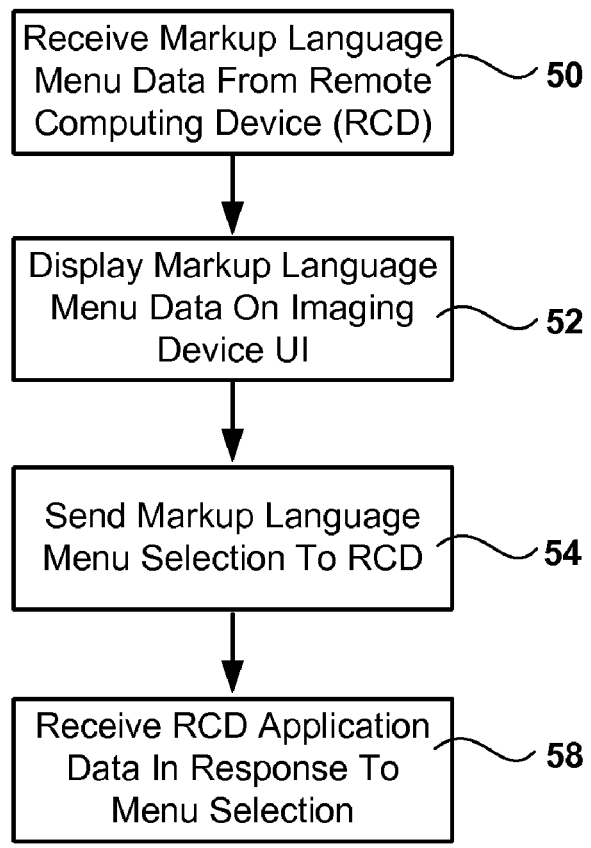
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received though its user interface 32 to a remote computing device. The remote computing device that receives the user input may then run an application or otherwise process the user input and return the results of the processing to the imaging device 30. Accordingly, the imaging device 30 is further configured to receive 56 processed data from a remote computing device. In some embodiments, the imaging device 30 may perform one or more functions in response to the receipt 56 of processed data.

Figure 6:
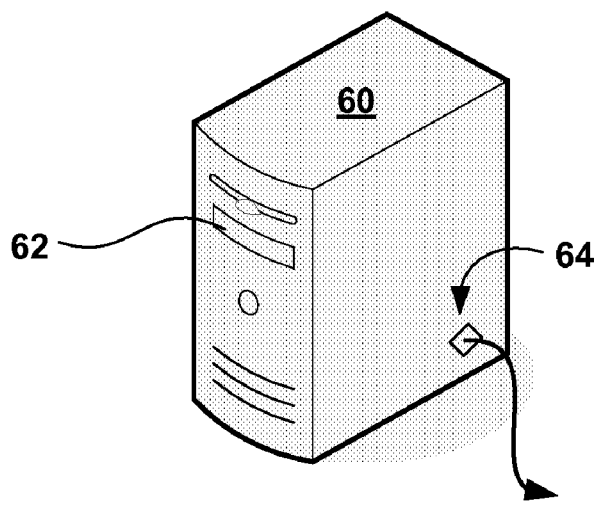
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
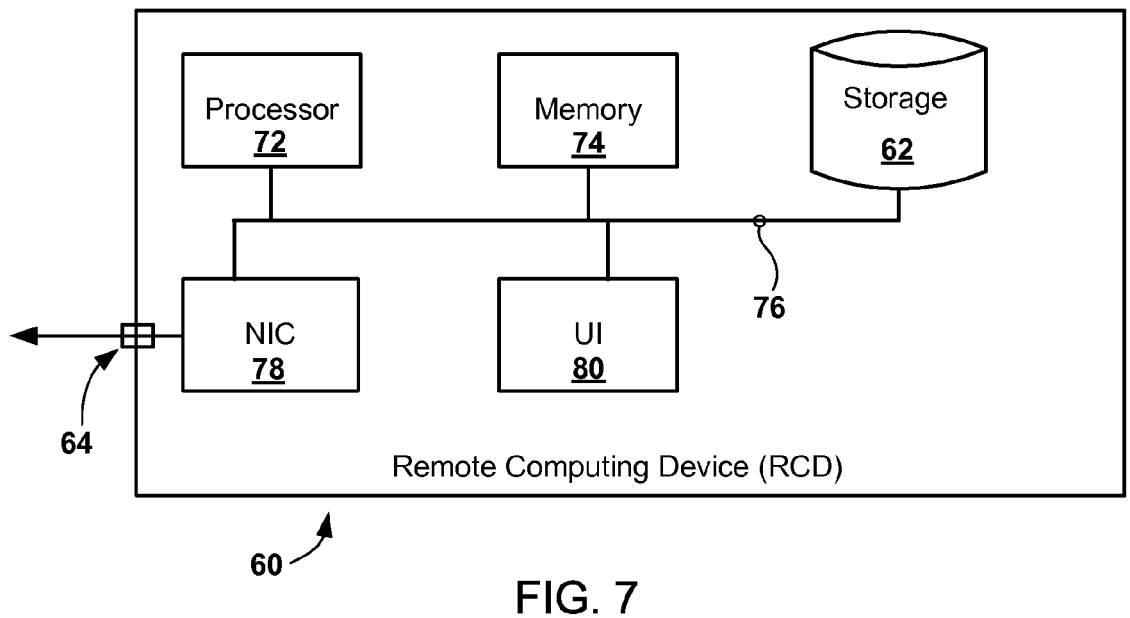
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
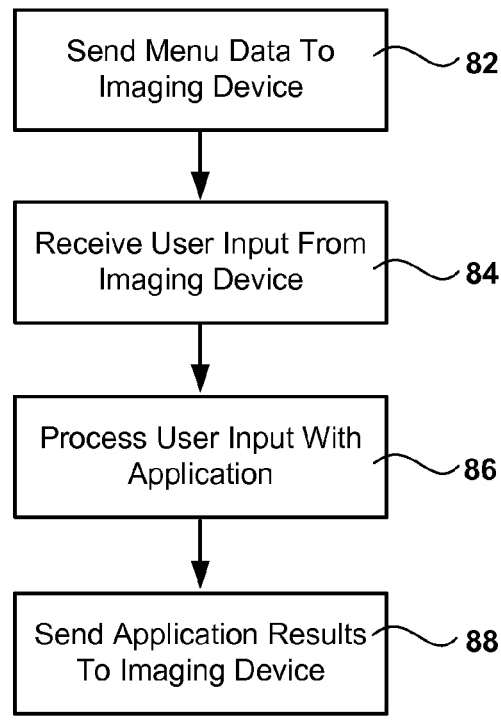
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
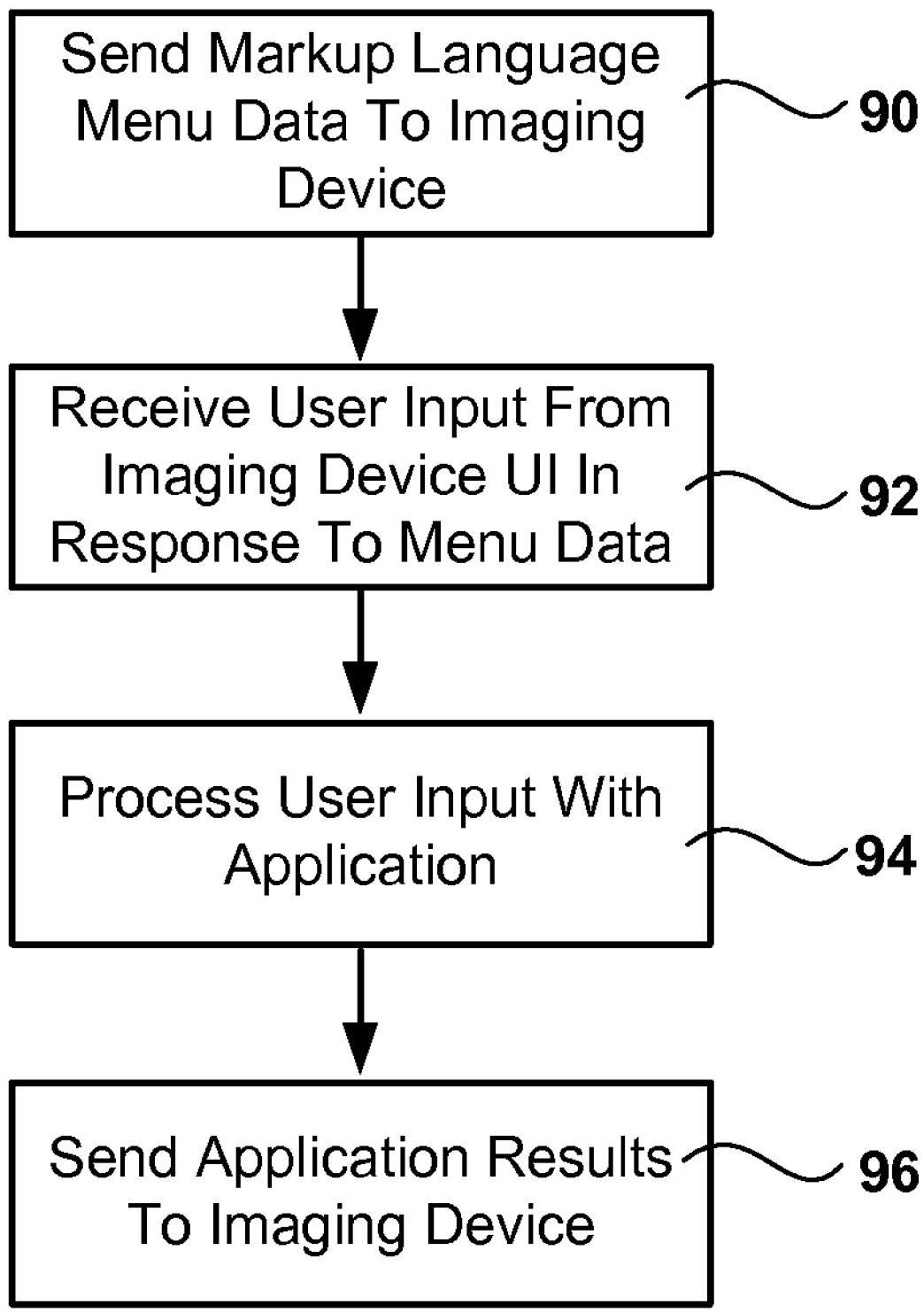
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
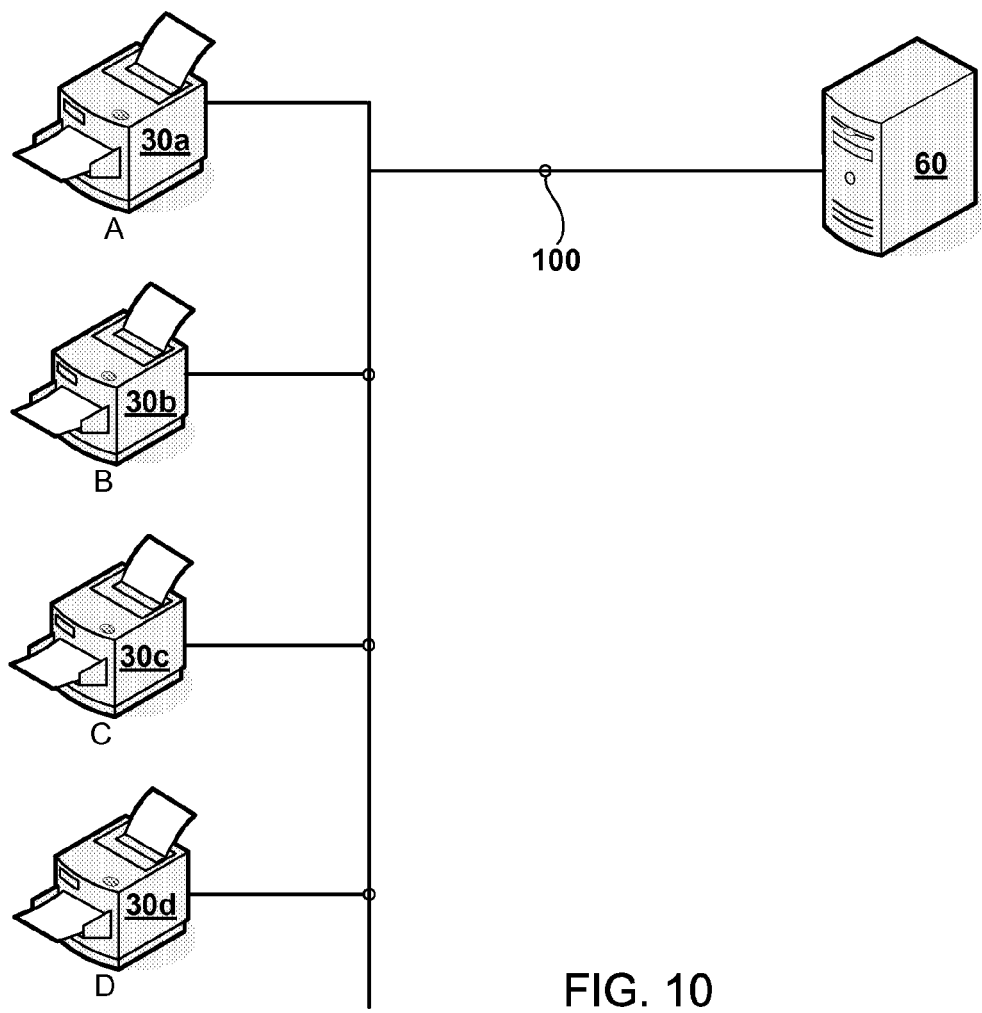
FIG. 10 is a diagram showing a system comprising multiple imaging devices in connection with a remote computing device.
Figure 11:
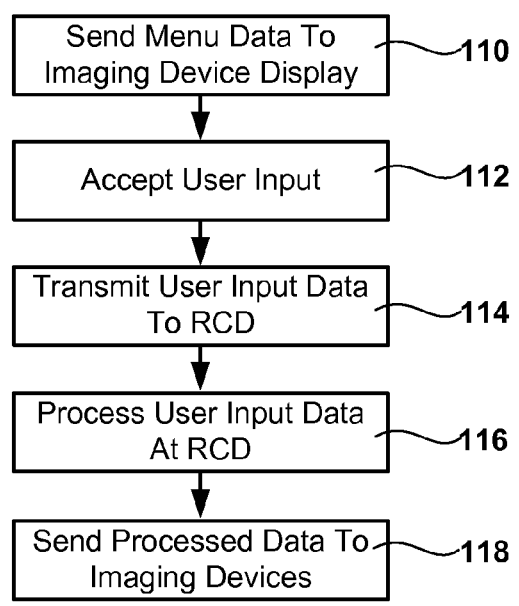
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30a-30d. In these embodiments, at least one of the imaging devices 30a-30d comprises a user interface 32 with a display 36 and user input panel 34 that is integral with the display (i.e., touch-screen) or a separate input unit. RCD 60 is connected to imaging devices 30a-30d by a communications link and network 100 to enable data transmission between RCD 60 and imaging devices 30a-30d.

In these embodiments, menu data is stored on RCD 60 and sent 110 to at least one of the imaging devices 30a-30d where the menu data is displayed on a user interface. Any of Imaging devices 30a-30d that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30a-30d.

In these embodiments, a single RCD 60 may be used to provide processing power, resources and functionality to a plurality of imaging devices 30a-30d without reproducing these resources in each imaging device. In some embodiments, data generated by input on one imaging device 30a may be directed to another imaging device 30d for processed data output or final processing.

Figure 12:
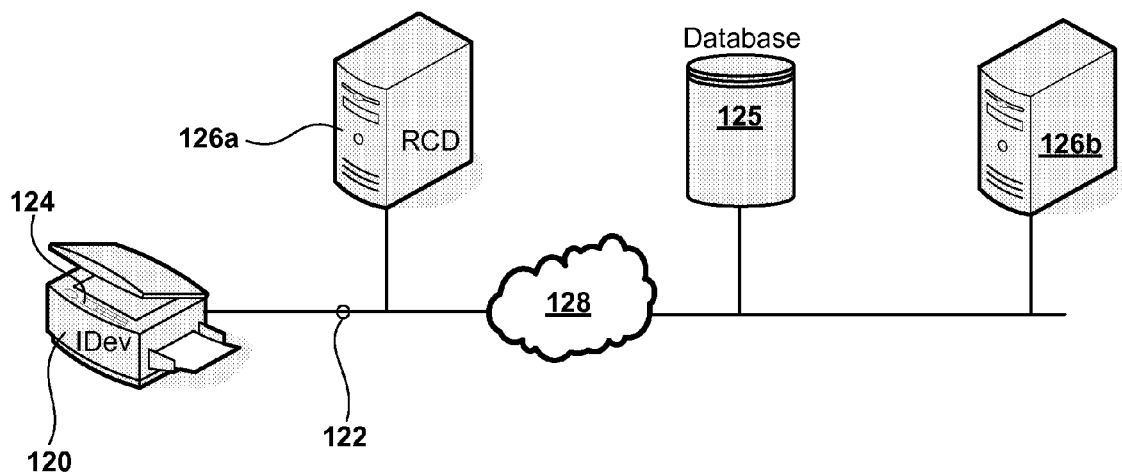
FIG. 12 is a diagram showing components of some embodiments comprising linked resources.

Some embodiments of the present invention may be described with reference to FIG. 12. In these embodiments, an imaging device (IDev) 120 comprises a user interface 124, which is capable of receiving user input and displaying data to a user. The user interface 124 will typically comprise a display, often in the form of a touch panel. The display may be used to display data to a user. This data may comprise menu data to prompt for a user selection or data entry, such as a user ID and password, form selection or some other input. The imaging device 120 has a communication link 122, which may comprise a typical computer network connection, a serial cable or some other wired or wireless communication link as described in other embodiments. The communication link 122 may connect the imaging device 120 to a remote computing device (RCD) 126a, 126b, such as a server. The RCD 126a, 126b may be used to store documents, such as forms, and other data and make that data accessible from the imaging device 120. The RCD 126a, 126b may also execute applications that interact with or receive input from the imaging device 120 and its user interface 124. In some embodiments, a database 125 may be linked to the imaging device 120 and/or an RCD 126a, 126b. In some embodiments, an RCD 126b or database 125 may be connected to an IDev 120 over a wide area network such as the internet 128.

Functionality Standardization and Display Customization Embodiments

Some embodiments of the present invention comprise methods and systems for functionality standardization with imaging device (IDev) display customization. The look-and-feel of an IDev operation-panel display is a constituent part of the IDev from both the operational and marketing perspective. Applications developed on a remote computing device (RCD) intended to run on a multiplicity of IDevs, while requiring the same operational function on each of the variety of IDevs, benefit by retaining the look-and-feel customary to each particular IDev. It is undesirable that application developers require a priori knowledge and understanding of the layout and display attributes distinctive to a target IDev. In exemplary embodiments of the present invention, an application developer may write a single application that will retain functionality on a multiplicity of IDevs while reflecting the look-and-feel of individual IDevs.

Some embodiments of the present invention achieve the above by separation of layout and format information, IDev-dependent information, from function and operation information, IDev-independent information. The application running on the RCD communicates display data formatted to a predefined syntactic profile that the IDev integrates into a form that defines the look-and-feel of the IDev. The composition of control buttons, content area, and an optional paging area for navigation between multiple pages of content may comprise a form matched to a syntactic profile to which display data may be formatted. The IDev display information is formed by combining the function information provided by the application, the IDev-independent information with the layout and look-and-feel, the IDev-dependent information, into the integrated page. Exemplary embodiments described herein may comprise various control elements such as control buttons, checkboxes, check buttons, radio buttons, soft keys, hard keys, pointer-operated controls, and others known in the art. These control elements are merely exemplary and the present invention does not rely on a particular control element.

Some embodiments of the present invention comprise methods and systems for imaging device (IDev) display standardization that allow imaging devices with diverse operation-panel display characteristics and user-input-device capabilities to display standardized application user interface screens. In some exemplary embodiments of the present invention, an application developer may write a single application that may be used by a user at an IDev equipped with a physical keyboard peripheral and a UI display capable of displaying only three lines of text. Another user at a different IDev that is not equipped with a physical keyboard, and which has a larger UI display capable of displaying a "soft keyboard" along with more lines of text may access the same application and view the same UI screens as the first user without the need of writing multiple versions of the application customized for every IDev UI display possibility.

Some embodiments of the present invention may comprise imaging devices (IDevs) equipped with embedded forms which may comprise formatting instructions specific to that IDev's operation panel display and input capabilities. These stored forms may be integrated with UI data received from remote applications to form a standardized page specifically formatted to be displayed on that IDev's UI display. In some exemplary embodiments, a form may comprise an XHTML form class that may provide buttons, titles and layout information for various application UI screens such as login and menus.

Some embodiments of the present invention may comprise applications written to operate in conjunction with IDev format forms. These applications may generate application-specific template field data (ASTFD) and a form ID which may be sent to an IDev when requested. The IDev may then use the form ID from the application to identify the corresponding format form stored on the IDev and may then integrate the format form with the ASTFD to form a customized application screen for that IDev's UI display. In some exemplary embodiments a form ID may comprise an XHTML form class reference that may specify the type of form to be used for that particular data.

In further embodiments of the present invention, a Template Server Application (TSA) may be used to manage the ASTFD and form IDs for multiple applications. In some embodiments, when an application request is received from an IDev, the TSA may match the application selection with the corresponding ASTFD and form ID and send the ASTFD and form ID back to the IDev. The TSA may work in conjunction with one or more other applications to format data and interface with an IDev.

Some embodiments of the present invention may comprise a stand-alone imaging device (IDev) with internal processing capabilities. Other embodiments may comprise an imaging device (IDev) in communication with one or more remote computing devices (RCDs).

Figure 13:
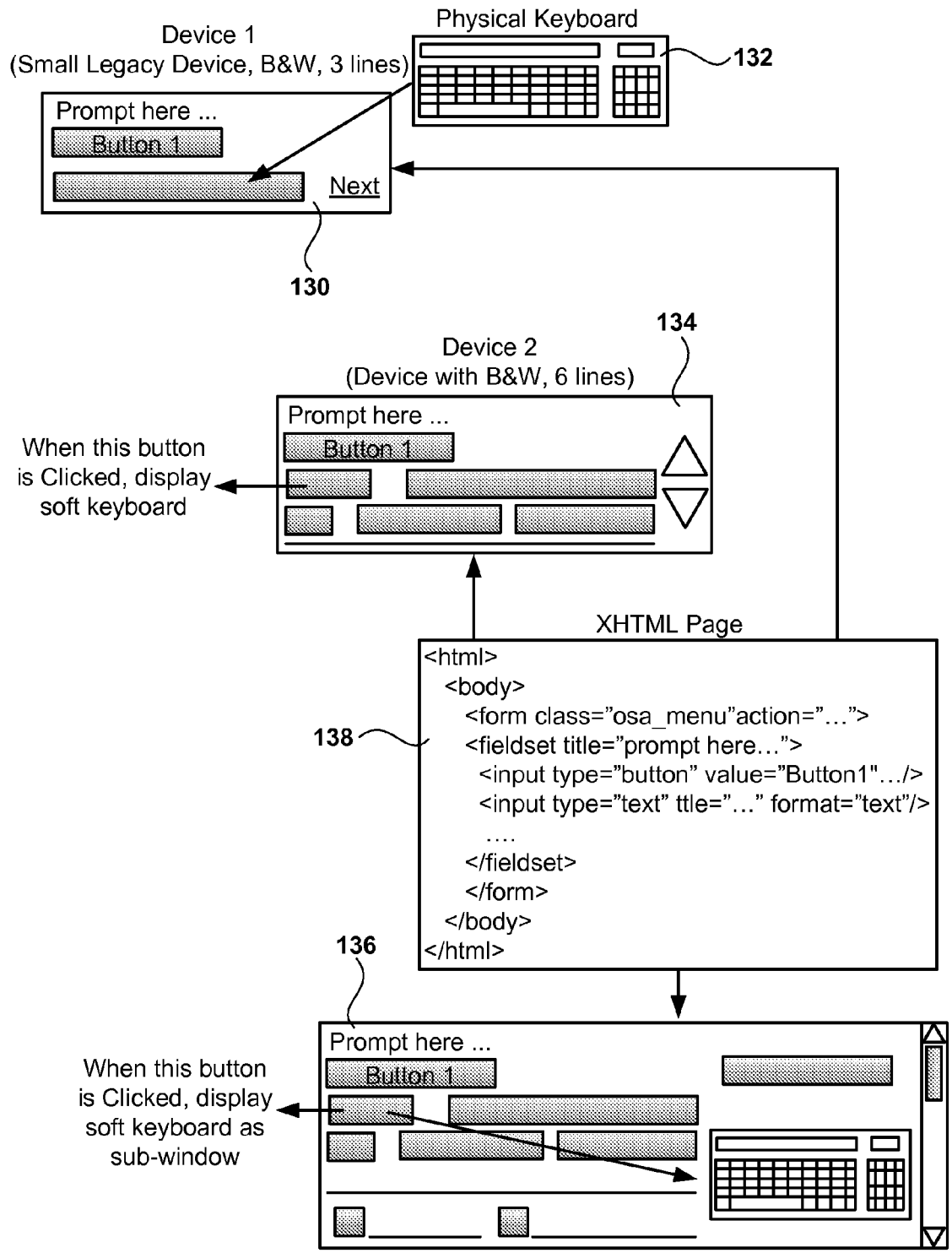
FIG. 13 is a diagram showing a system for imaging device display standardization.

In an exemplary embodiment, illustrated in FIG. 13, an imaging device (IDev) application login method 138 may request input of a text string such as a name and a password at a UI for access to the application. How this input is accomplished may vary from one imaging device to another depending on size and input capability constraints imposed upon a specific IDev UI and its display. In some embodiments of the present invention an IDev UI display 130 may only be able to display 3 lines of text and may have a physical keyboard 132 attached, via USB or some other method, for user input of text.

Other IDev UI displays 134 may have larger display capacity, but may not have a physical keyboard attached for data input. These embodiments may have a soft keyboard which may be accessed at the UI display. In these embodiments, the IDev UI display menus may comprise both a text field and a button field for the soft keyboard or may alternate between the two fields depending on user input.

Other imaging devices may allow an application menu screen on an IDev UI display 136 to show a text field and soft keyboard displayed simultaneously. The IDev application may provide the same template field data and form ID 138 to every IDev that requests the application. The requesting IDev may match the field data and form ID provided by the application to a corresponding form stored on the IDev. The stored form may provide the necessary formatting information required to display the data correctly on that specific IDev UI display.

Figure 14A:
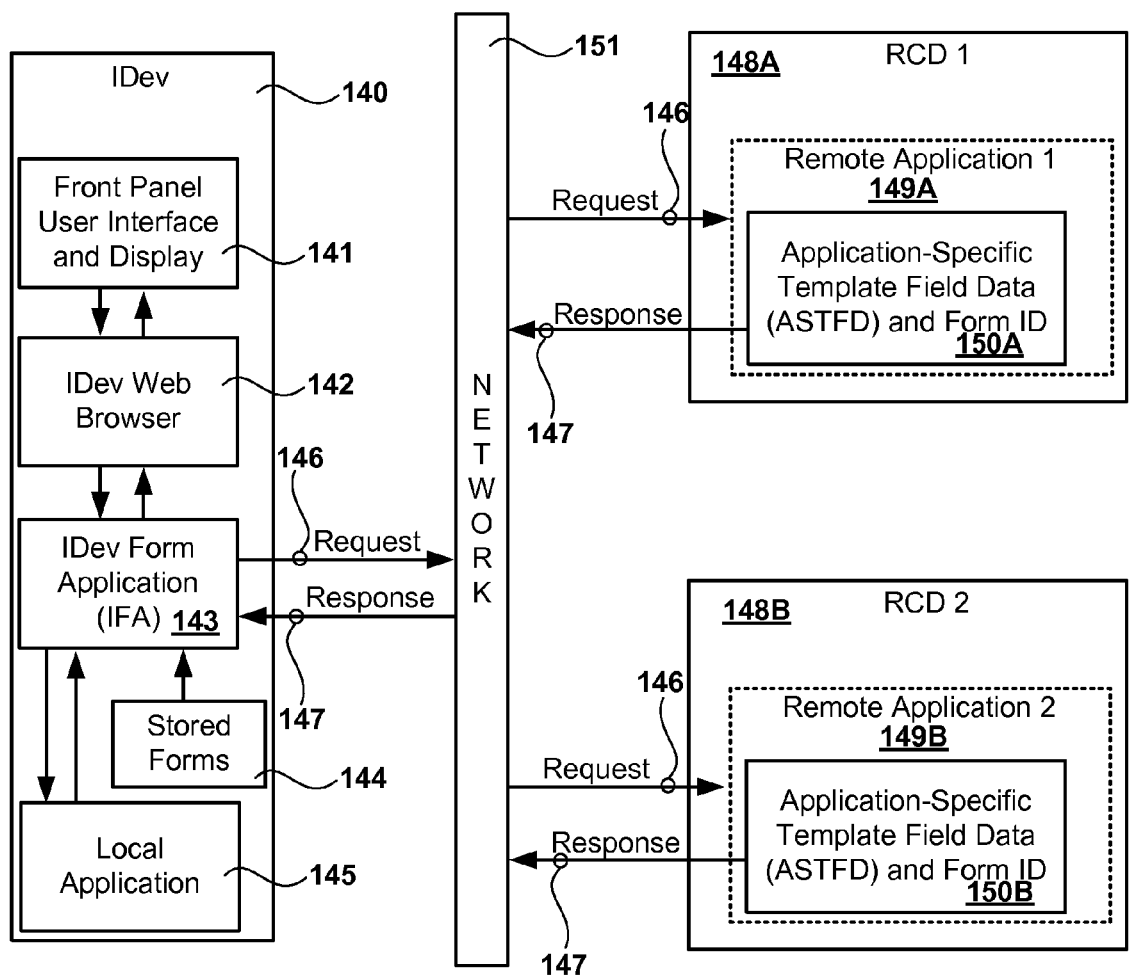
FIG. 14A is a diagram showing a system for imaging device display standardization with multiple applications.

Some embodiments of the present invention may be described with reference to FIG. 14A. In these embodiments, an IDev 140 may comprise a front panel user interface and display 141, an IDev web browser 142, a form application 143, stored forms 144, and an optional local application 145. The IDev may be connected to a communication network 151 linking it to one or more remote computing devices (RCDs) 148A & 148B on the system. An RCD may comprise a remote (remote to the IDev) application 149A & 149B with application-specific template field data (ASTFD) and at least one form ID 150A & 150B.

The IDev 140 may communicate with a local application 145 directly. The IDev may also communicate with remote applications 149A & 149B through the network 151. In some exemplary embodiments, this may be achieved using HTTP requests 146 and responses 147.

Figure 14B:
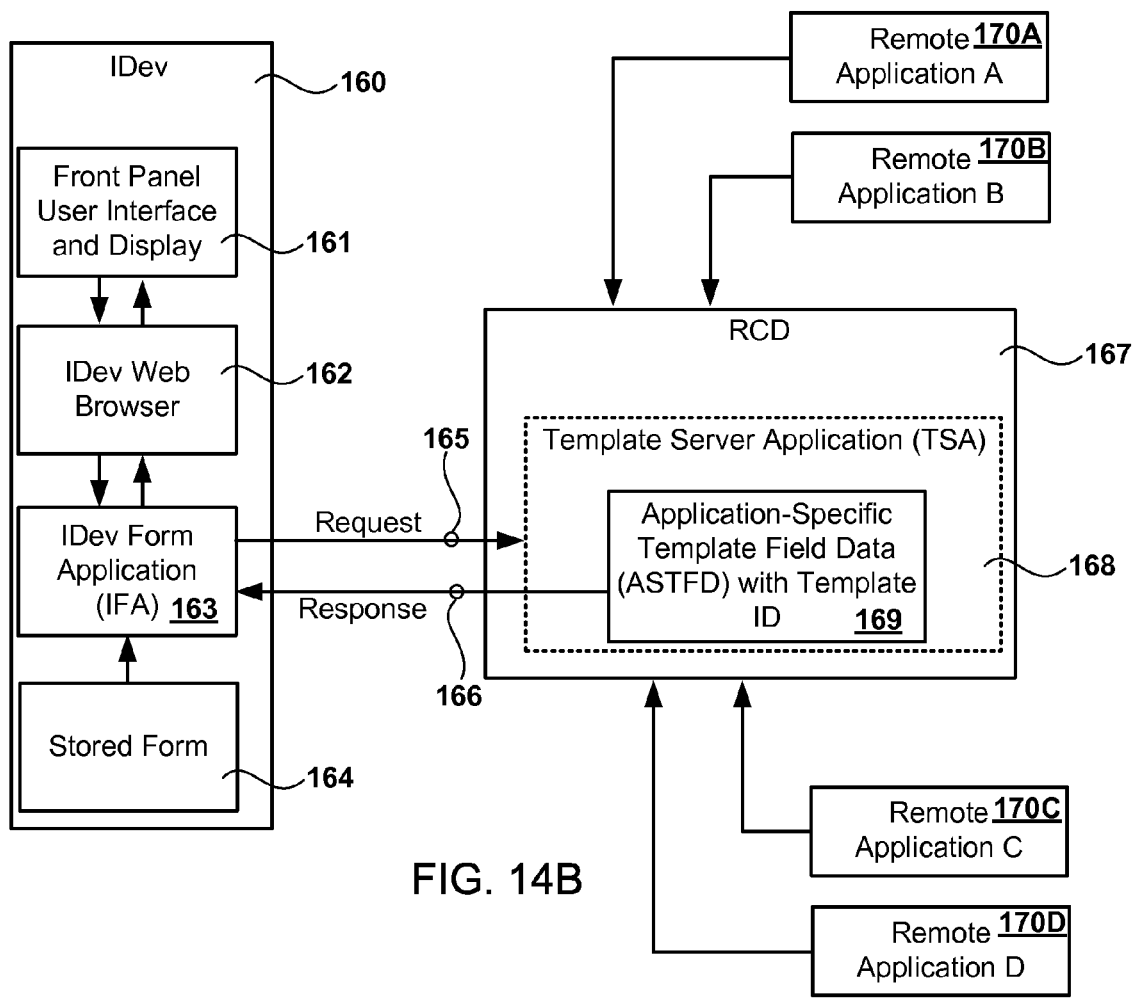
FIG. 14B is a diagram showing a system for imaging device display standardization with a Template Server Application (TSA)

Some embodiments of the present invention may be described with reference to FIG. 14B. In these embodiments, an IDev 160 may comprise a front panel user interface and display 161, an IDev web browser 162, a form application 163 and stored forms 164 that are tailored to the IDev's display and UI characteristics. The IDev may be connected to a remote computing device (RCD) 167. In these embodiments, an RCD may comprise a template server application (TSA) 168 with application-specific template field data (ASTFD) and at least one form ID 169 for a plurality of different remote IDev applications 170A-170D. The TSA may receive all requests from the IDev for application UI screens and may match the requests with the corresponding ASTFD and form IDs for the requested applications. In these embodiments, the TSA 168 may take requests from applications 170A-170D and format their requests into the proper syntactic profile or "template" for the IDev 160. Likewise, the TSA 168 may receive communications from the IDev 160 and format or translate those communications into a format that can be understood by a specific application 170A-170D. The IDev 160 may communicate with the TSA application 168 through a network or direct connection. In some exemplary embodiments, this may be achieved using HTTP requests 165 and responses 166.

Figure 15:
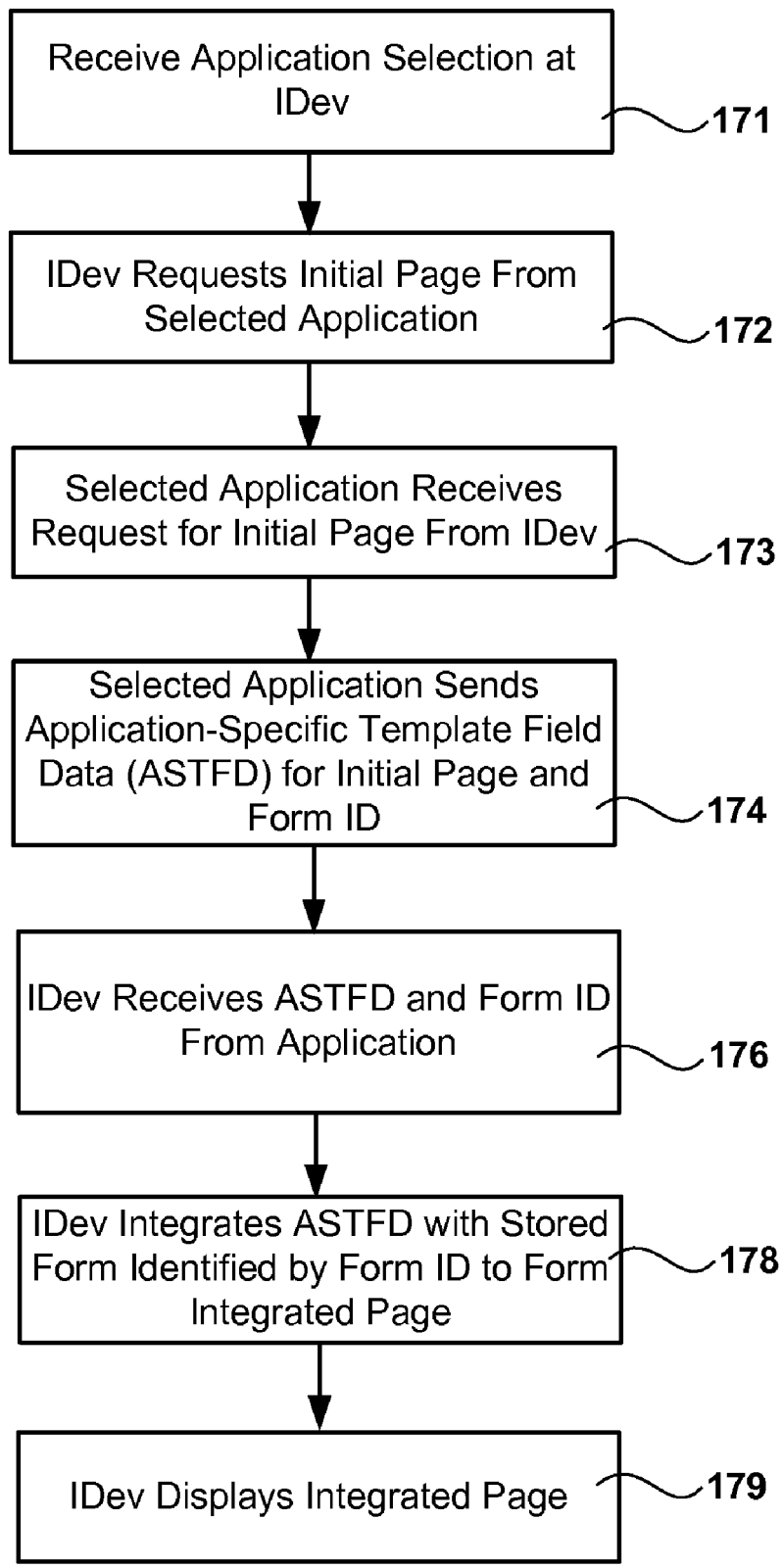
FIG. 15 is a chart showing steps of an embodiment comprising imaging device display element standardization.

Some embodiments of the present invention, illustrated in FIG. 15, comprise receiving 171 an application selection from a UI and requesting 172 an initial menu page from the selected application. The selected application may then receive 173 the request and send 174 application-specific template field data (ASTFD) and a form ID for the initial page to the IDev. The IDev may then receive 176 the ASTFD and form ID and may integrate the ASTFD 178 with a stored form identified by the form ID to form an integrated page. The IDev may then display 179 the integrated page at the UI operation panel or elsewhere.

Figure 16:
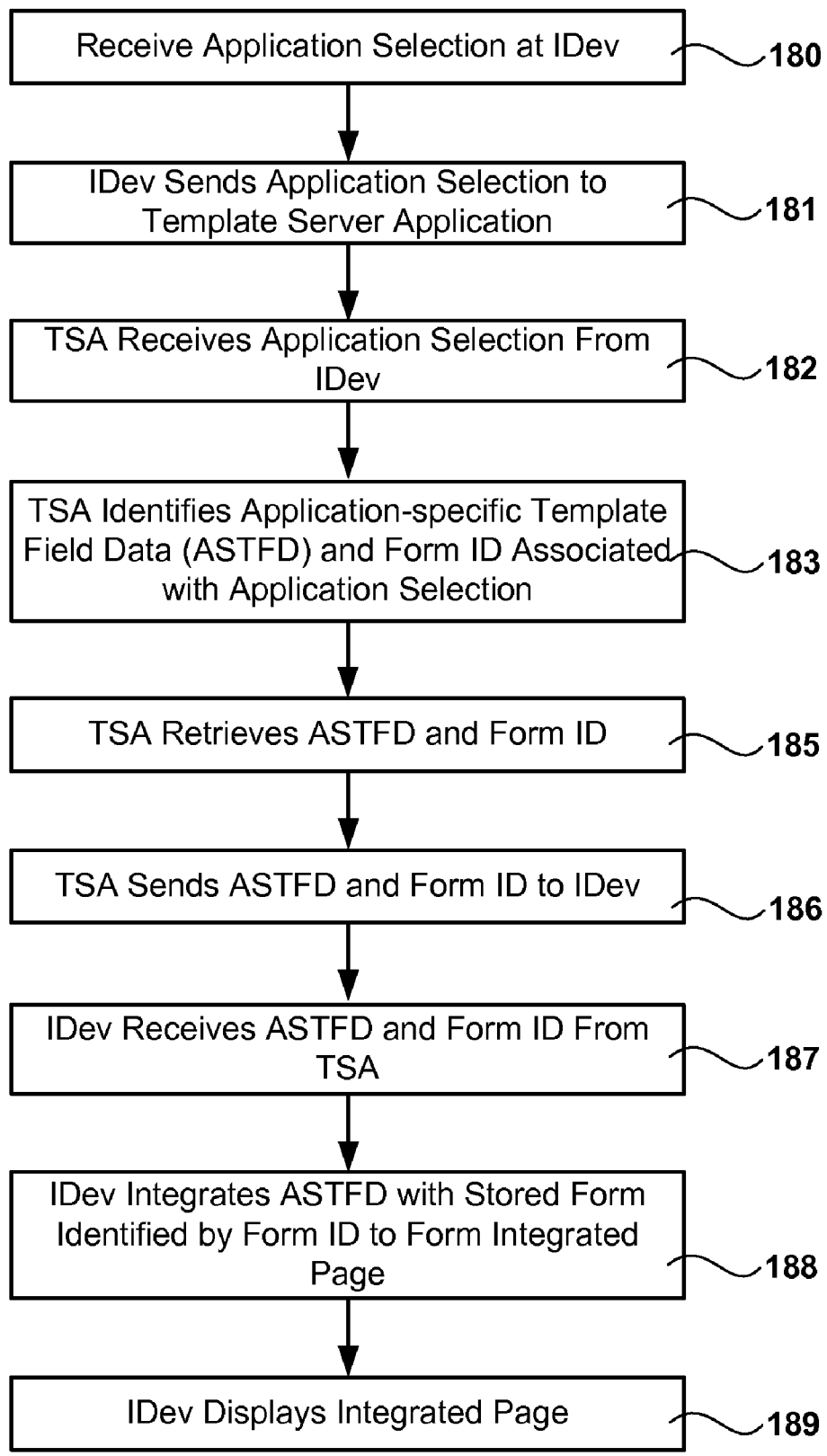
FIG. 16 is a chart showing steps of an embodiment comprising a Template Server Application.

Some embodiments of the present invention, illustrated in FIG. 16, comprise receiving 180 an application selection from a UI and sending 181 the application selection to a template server application (TSA). The TSA may then receive 182 the application selection and identify 183 application-specific template field data (ASTFD) and a form ID associated with the application selection. In some embodiments, the TSA may request the appropriate information from one or more specified applications and translate or reformat the information. The TSA may retrieve 185 the ASTFD and form ID from another application or source and may send 186 the ASTFD and form ID to the IDev. The IDev may then receive 187 the ASTFD and form ID and may integrate the ASTFD 188 with a stored form identified by the form ID to form an integrated page. The IDev may then display 189 the integrated page at the UI operation panel or elsewhere.

Figure 17:
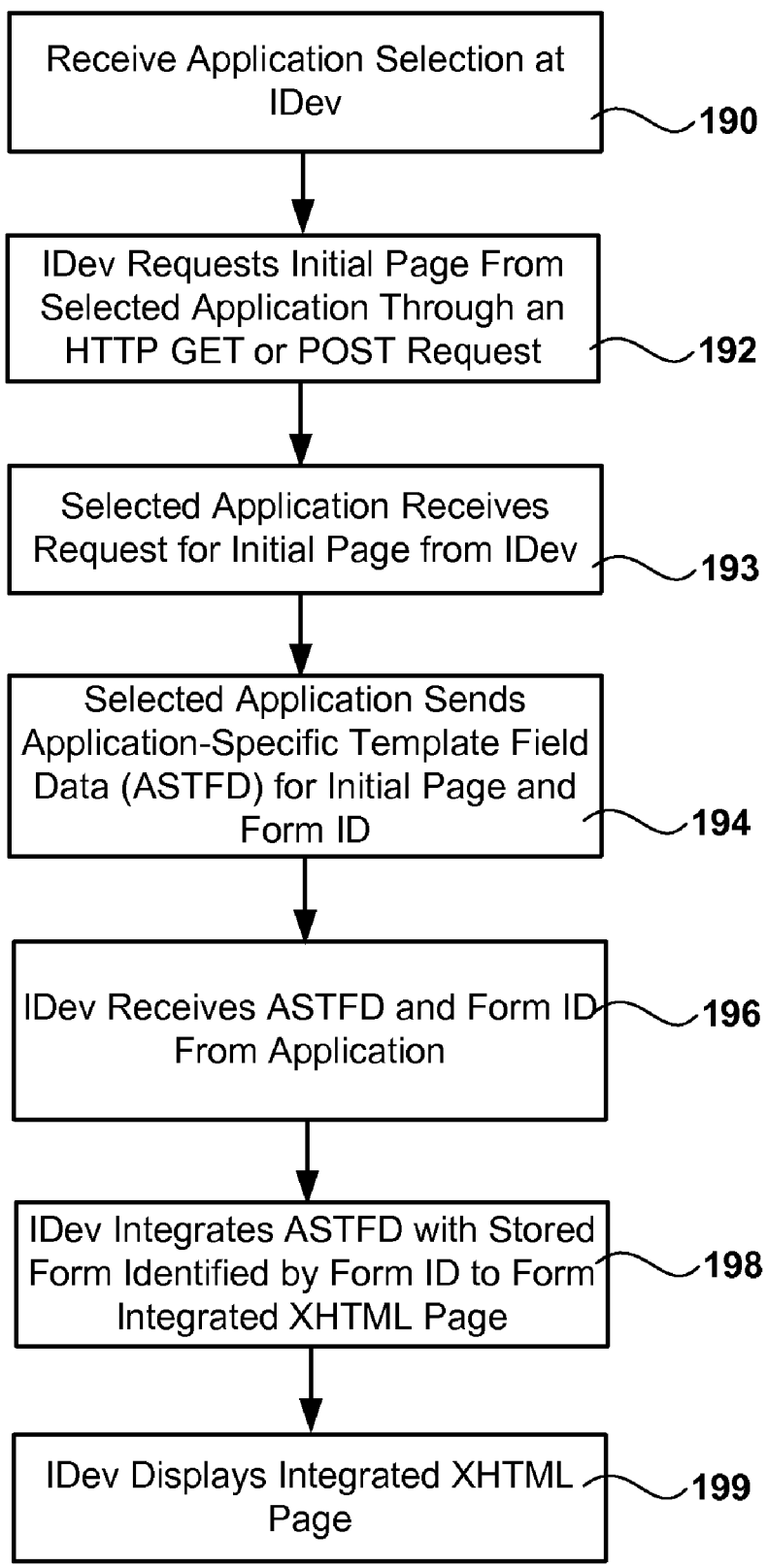
FIG. 17 is a chart showing steps of an embodiment comprising display standardization using a XHTML page.

Some embodiments of the present invention, illustrated in FIG. 17, comprise receiving 190 an application selection from an IDev and requesting 192 the initial menu page from the selected application using an HTTP GET or POST request. The selected application may then receive 193 the request and send 194 application-specific template field data (ASTFD) and a form ID for the initial page to the IDev. The IDev may then receive 196 the ASTFD and form ID and may integrate it 198 with a stored form identified by the form ID to create an integrated XHTML page. The IDev may then display 199 the integrated XHTML page at the UI operation panel.

Figure 18:
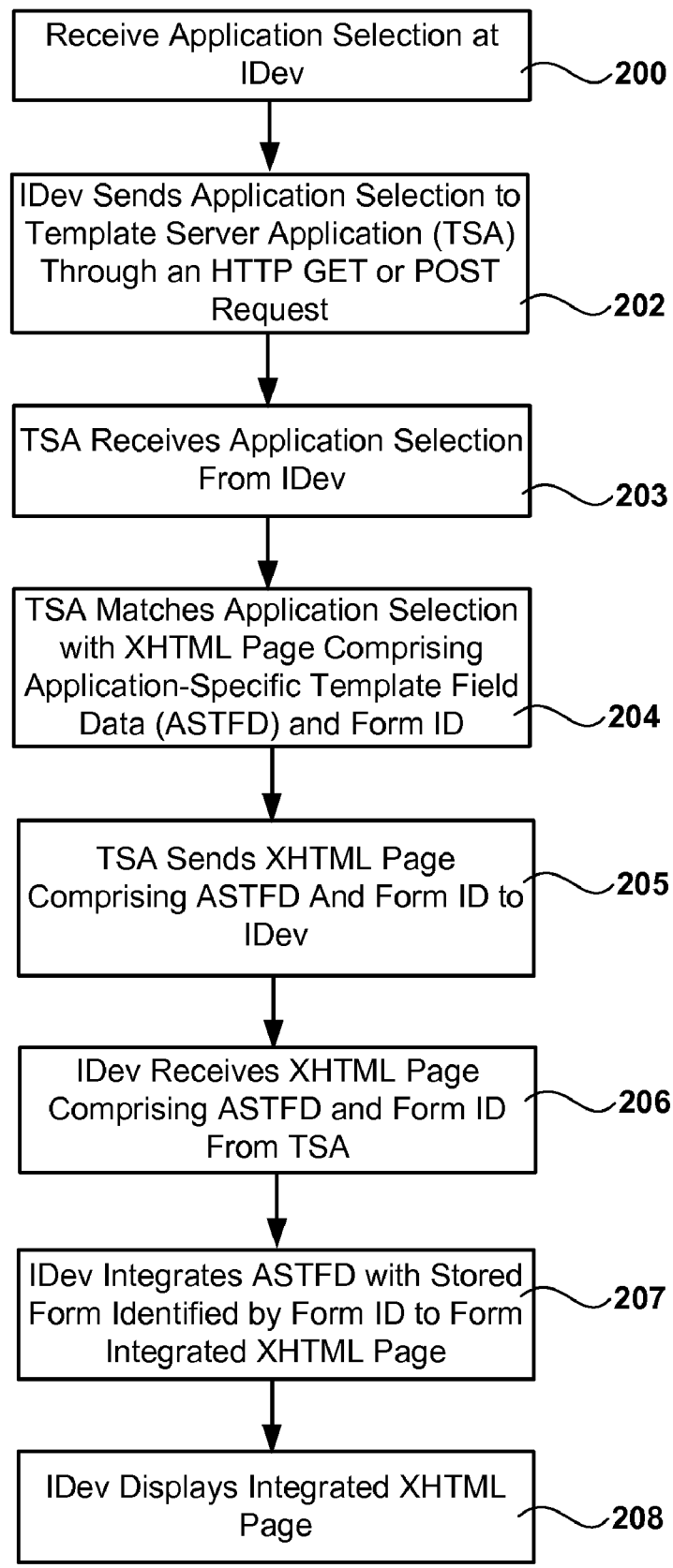
FIG. 18 is a chart showing steps of an embodiment comprising a template server application and HTTP requests.

Further embodiments, illustrated in FIG. 18, comprise receiving 200 an application selection from a UI and sending 202 the application selection to a template server application (TSA) using an HTTP GET or POST request. The TSA may then receive 203 the application selection and match 204 it with an XHTML page comprising application-specific template field data (ASTFD) and a form ID. The TSA may request the ASTFD and form ID from one or more applications or retrieve it from a source. The TSA may then send 205 the XHTML page comprising ASTFD and form ID to the IDev. The IDev may then receive 206 the XHTML page comprising ASTFD and form ID and may integrate it 207 with a stored form identified by the form ID to generate an integrated XHTML page. The IDev may then display 208 the integrated XHTML page at the UI operation panel or elsewhere.

Figure 19:
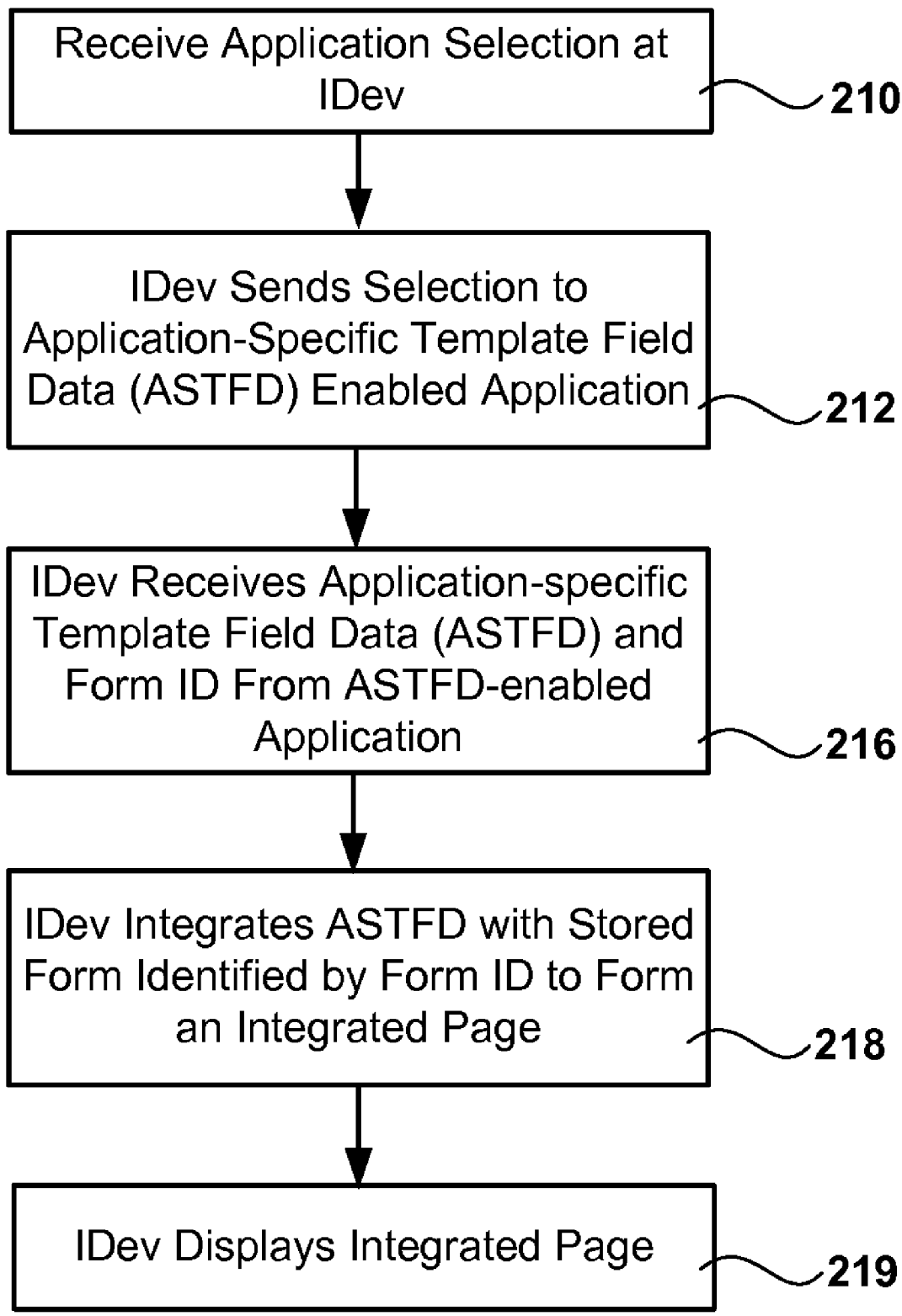
FIG. 19 is a chart showing steps of an embodiment comprising display standardization on an imaging device (IDev)

Some imaging device embodiments of the present invention, illustrated in FIG. 19, comprise receiving 210 an application selection at an imaging device (IDev) UI and sending 212 the application selection to an application-specific template field data (ASTFD) enabled application. The IDev may then receive 216 the ASTFD and form ID from the ASTFD-enabled application and may integrate 218 the ASTFD with a stored form identified by the form ID to generate an integrated page. The IDev may then display 219 the integrated page at the UI operation panel or elsewhere.

Figure 20:
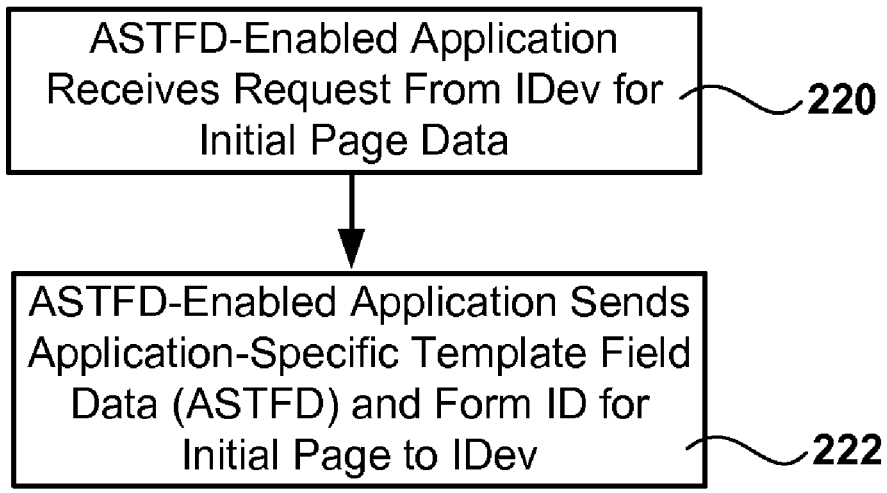
FIG. 20 is a chart showing steps of an embodiment comprising an application-specific template field data (ASTFD) enabled application.

In some application embodiments, illustrated in FIG. 20, an ASTFD-enabled application may receive 220 a request from an imaging device (IDev) for initial page data. The ASTFD-enabled application may then send 222 application-specific template field data (ASTFD) and a form ID for the requested initial page.

Figure 21:
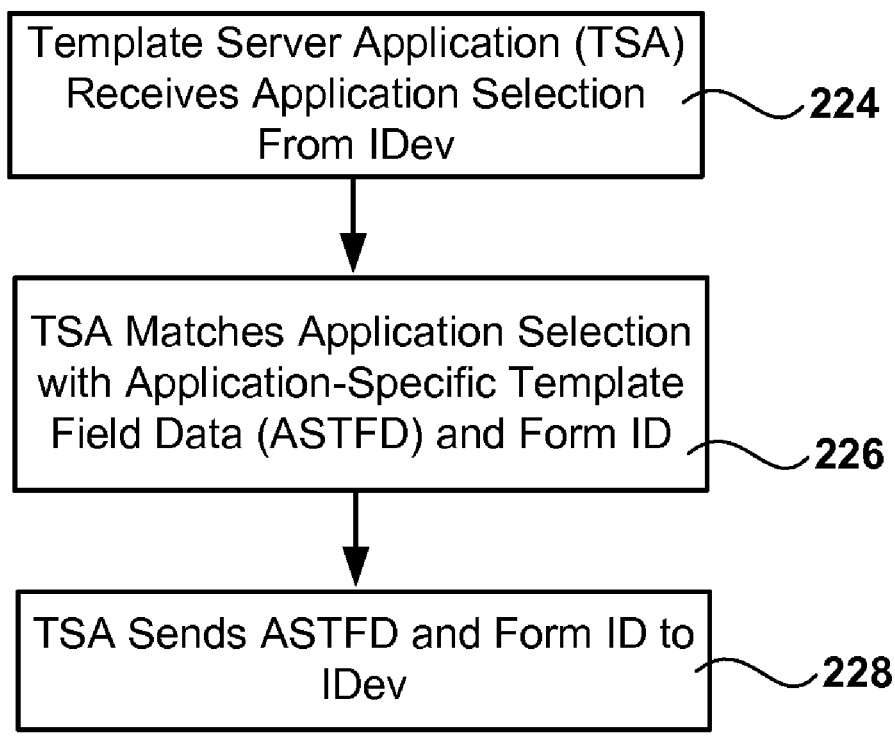
FIG. 21 is a chart showing steps of an embodiment comprising a template server application (TSA) on a remote computing device (RCD)

In some template server application embodiments, illustrated in FIG. 21, a template server application (TSA) may receive 224 an application selection from an imaging device (IDev). The TSA may then match 226 the application selection with application-specific template field data (ASTFD) and a form ID for the selected application. The TSA may then send 228 the ASTFD and form ID to the IDev.

Figure 22:
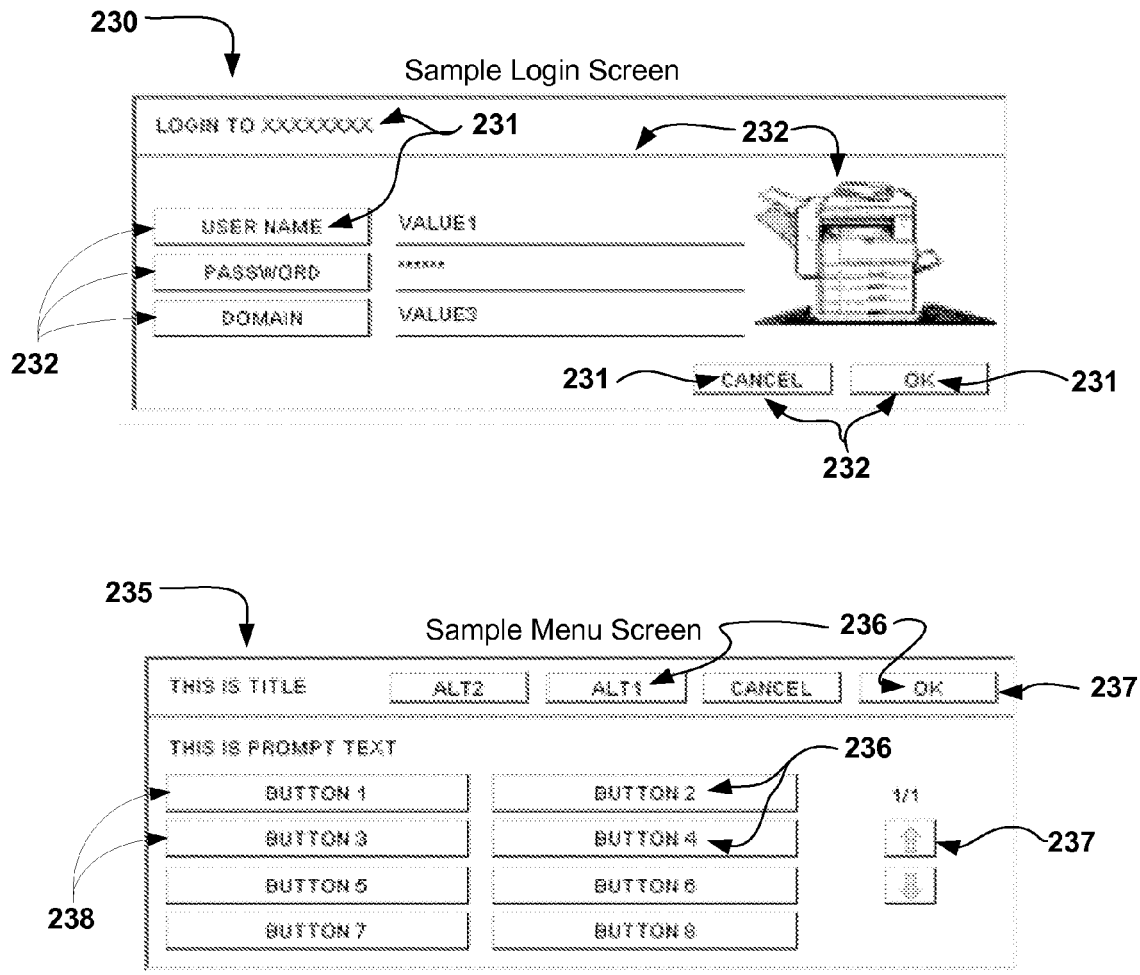
FIG. 22 is a diagram showing an exemplary embodiment comprising IDev display screens.

In some exemplary embodiments, illustrated in FIG. 22, an imaging device UI operation panel may display an application login screen 230 after integrating application-specific template field data (ASTFD) 231, such as button captions, application-specific text and other elements, with login screen format data 232, such as button formatting and layout, graphical elements, text formatting, text and field locations, color, shading and other UI-specific and device-specific elements, stored in a form on the IDev. An imaging device UI operation panel may also display an application menu screen 235 after integrating application-specific template field data (ASTFD) 236, such as button captions, application-specific text and other elements, with menu screen format data 237, such as button formatting and layout, graphical elements, text formatting, text and field locations, color, shading and other UI-specific and device-specific elements, stored in a form on the IDev.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for imaging device (IDev) display standardization, said method comprising:

sending application menu data from a remote computing device (RCD) to a web service module on said IDev, wherein said application menu data is in the form of a markup language message, wherein said application menu data registers a remote template server application (TSA) on said RCD with said IDev via a device management application programming interface (API) such that input received on an IDev user interface (UI) is routed to said remote application on said RCD, wherein said remote application may be activated by a selection on said IDev UI and wherein said sending to said device management API allows said remote application on said RCD to obtain and set IDev device status settings, IDev device configuration options, IDev web page settings, IDev key operator programs, IDev job status data, IDev click counts, IDev data security settings and IDev reboot functions;

receiving an application selection from an IDev user interface (UI) at said TSA, via said IDev device management API;

matching said application selection from said IDev UI with IDev-independent display information;

sending said IDev-independent display information to said IDev, wherein said IDev-independent display information enables said IDev to integrate said IDev-independent display information with IDev-dependent formatting information residing on said IDev to form IDev display data, wherein said IDev-dependent formatting information relates to an IDev display dimension and an IDev user interface (UI) configuration such that said integrating formats said IDev-independent display information for display on said IDev display with said IDev display dimension and configures said IDev UI to receive input in relation to said IDev-independent display information; and receiving user input from said IDev, wherein said user input was received in response to display of said IDev-independent display information.

2. A method as described in claim 1 wherein said IDev-independent display information is formatted in a markup language.

3. A system for imaging device (IDev) display standardization, said system comprising:

a sender for sending application menu data from a remote computing device (RCD) to a web service module on said IDev, wherein said application menu data is in the form of a markup language message, wherein said application menu data registers a remote template server application (TSA) on said RCD with said IDev via a device management application programming interface (API) on said IDev such that input received on an IDev user interface (UI) is routed to said remote application on said RCD, wherein said remote application may be activated by a selection on said IDev UI and wherein said sending to said device management API allows said remote application on said RCD to obtain and set IDev device status settings, IDev device configuration options, IDev web page settings, IDev key operator programs, IDev job status data, IDev click counts, IDev data security settings and IDev reboot functions;

an application selection receiver for receiving an application selection from an IDev at said TSA, via said IDev device management API;

a matcher for matching said application selection from said IDev UI with IDev-independent display information;

a sender for sending said IDev-independent display information to said IDev, wherein said IDev-independent display information enables said IDev to integrate said IDev-independent display information with IDev-dependent formatting information residing on said IDev to form IDev display data, wherein said IDev-dependent formatting information relates to an IDev display dimension and an IDev user interface (UI) configuration such that said integrating formats said IDev-independent display information for display on said IDev display with said IDev display dimension and configures said IDev UI to receive input in relation to said IDev-independent display information; and a receiver for receiving user input from said IDev, wherein said user input was received in response to display of said IDev-independent display information.

4. A system as described in claim 3 wherein said IDev-independent display information is formatted in a markup language.

* * * * *